(12) United States Patent
McQuade et al.

(10) Patent No.: US 10,354,108 B2
(45) Date of Patent: Jul. 16, 2019

(54) METHOD AND SYSTEM FOR COLLECTING OBJECT ID DATA WHILE COLLECTING REFUSE FROM REFUSE CONTAINERS

(71) Applicant: ZONAR SYSTEMS, INC., Seattle, WA (US)

(72) Inventors: Charles Michael McQuade, Issaquah, WA (US); Brett Brinton, Seattle, WA (US)

(73) Assignee: ZONAR SYSTEMS, INC., Seattle, WA (US)

( * ) Notice: Subject to any disclaimer, the term of this patent is extended or adjusted under 35 U.S.C. 154(b) by 0 days.

(21) Appl. No.: 16/157,490

(22) Filed: Oct. 11, 2018

(65) Prior Publication Data

US 2019/0042816 A1   Feb. 7, 2019

Related U.S. Application Data

(63) Continuation of application No. 15/235,853, filed on Aug. 12, 2016, which is a continuation of application
(Continued)

(51) Int. Cl.
*G06K 7/10* (2006.01)
*G06F 16/29* (2019.01)
(Continued)

(52) U.S. Cl.
CPC ..... *G06K 7/10861* (2013.01); *G06F 16/2365* (2019.01); *G06F 16/29* (2019.01);
(Continued)

(58) Field of Classification Search
CPC .......... B65F 2003/022; B65F 2003/023; B65F 2003/0276; B65F 2003/0279; B65F 1/1484; G06K 7/10861
See application file for complete search history.

(56) References Cited

U.S. PATENT DOCUMENTS 3,573,620 A  6/1971 Ashley et al.
3,990,067 A  2/1976 Van Dusen et al.
(Continued)

FOREIGN PATENT DOCUMENTS

CA  2138378  11/1994
CA  2326892  10/1999
(Continued)

OTHER PUBLICATIONS

"D.O.T. Driver Vehicle Inspection Reports on your wireless phone!" FleeTTrakkeR LLC 2002-2003 FleeTTrakkeR LLC . All rights reserved <http://www. fleettrakker.com/web/index. jsp> Accessed Mar. 12, 2004.
(Continued)

*Primary Examiner* — Orlando Bousono

(57) ABSTRACT

System and method for collecting object identification data from a plurality of objects that interact with a vehicle during operation of the vehicle, where the vehicle interacts with specific objects at specific geographical positions. An identification sensor is coupled to a geographical position sensor, and whenever an object is identified a record is generated, the record including the identification of the object, the position of the vehicle when the interaction between the object and the vehicle occurs, and the time of the interaction. Exemplary objects include passengers, containers, and documents. Exemplary interactions include loading/unloading an object from the vehicle, boarding a passenger, unloading a passenger, transferring a bulk material from the vehicle into a specific container, and/or transferring a bulk material from a specific container to the vehicle. The record may also include additional data about a parameter of the object (such as the object's weight, volume, or temperature).

8 Claims, 5 Drawing Sheets

Related U.S. Application Data

No. 15/083,208, filed on Mar. 28, 2016, now Pat. No. 9,858,462, which is a continuation of application No. 12/942,874, filed on Nov. 9, 2010, now abandoned.

(51) Int. Cl.
*G06F 16/955* (2019.01)
*G06F 16/23* (2019.01)
*G08G 1/00* (2006.01)
*G06K 19/06* (2006.01)
*G06K 19/07* (2006.01)
*G08B 21/18* (2006.01)

(52) U.S. Cl.
CPC ..... *G06F 16/955* (2019.01); *G06K 19/06028* (2013.01); *G06K 19/06187* (2013.01); *G06K 19/0723* (2013.01); *G08G 1/20* (2013.01); *G08B 21/18* (2013.01)

(56) References Cited

U.S. PATENT DOCUMENTS

| | | |
|---|---|---|
| 4,009,375 A | 2/1977 | White et al. |
| 4,025,791 A | 4/1977 | Lennington et al. |
| 4,092,718 A | 5/1978 | Wendt |
| 4,258,421 A | 3/1981 | Juhasz et al. |
| 4,263,945 A | 4/1981 | Van Ness |
| 4,325,057 A | 4/1982 | Bishop |
| 4,469,149 A | 4/1984 | Walkey et al. |
| 4,602,127 A | 7/1986 | Neely et al. |
| 4,651,157 A | 3/1987 | Gray et al. |
| 4,658,371 A | 4/1987 | Walsh et al. |
| 4,713,661 A | 12/1987 | Boone |
| 4,763,356 A | 9/1988 | Day, Jr. et al. |
| 4,799,162 A | 1/1989 | Shinakawa et al. |
| 4,804,937 A | 2/1989 | Barbiaux et al. |
| 4,814,711 A | 3/1989 | Olsen et al. |
| 4,846,233 A | 11/1989 | Fockens |
| 4,897,792 A | 1/1990 | Hosoi |
| 4,934,419 A | 6/1990 | Lamont et al. |
| 4,935,195 A | 6/1990 | Palusamy et al. |
| 5,007,786 A * | 4/1991 | Bingman ............... B65F 3/001 414/409 |
| 5,014,206 A * | 5/1991 | Scribner ............... G07C 5/008 340/3.31 |
| 5,058,044 A | 10/1991 | Stewart et al. |
| 5,072,380 A | 10/1991 | Randelman et al. |
| 5,068,656 A | 11/1991 | Sutherland |
| 5,119,894 A * | 6/1992 | Crawford ............. B65F 1/1484 177/139 |
| 5,128,651 A | 7/1992 | Heckart |
| 5,120,942 A | 9/1992 | Holland |
| 5,204,819 A | 4/1993 | Ryan |
| 5,206,643 A | 4/1993 | Eckelt |
| 5,209,312 A * | 5/1993 | Jensen ................. G01G 19/08 177/136 |
| 5,223,844 A | 6/1993 | Mansell et al. |
| 5,230,393 A * | 7/1993 | Mezey ................. B65F 3/08 177/139 |
| 5,243,323 A | 7/1993 | Rogers |
| 5,247,160 A | 9/1993 | Zicker |
| 5,304,744 A * | 4/1994 | Jensen ................. G01G 19/08 177/136 |
| 5,321,629 A | 6/1994 | Shirata et al. |
| 5,337,003 A | 9/1994 | Carmichael et al. |
| 5,359,522 A | 10/1994 | Ryan |
| 5,394,136 A | 2/1995 | Lammers et al. |
| 5,399,844 A | 3/1995 | Holland |
| 5,400,020 A | 3/1995 | Jones et al. |
| 5,442,553 A | 8/1995 | Parrillo |
| 5,459,304 A | 10/1995 | Eisenmann |
| 5,459,660 A | 10/1995 | Berra |
| 5,479,479 A | 12/1995 | Braitberg et al. |
| 5,488,352 A | 1/1996 | Jasper |
| 5,499,182 A | 3/1996 | Ousborne |
| 5,572,192 A | 5/1996 | Berube |
| 5,541,845 A | 7/1996 | Klein |
| 5,546,305 A | 8/1996 | Kondo |
| 5,557,254 A | 9/1996 | Johnson et al. |
| 5,557,268 A | 9/1996 | Hughes et al. |
| 5,585,552 A | 12/1996 | Heuston et al. |
| 5,594,650 A | 1/1997 | Shah et al. |
| 5,596,501 A | 1/1997 | Comer et al. |
| 5,600,323 A | 4/1997 | Boschini |
| 5,623,258 A | 4/1997 | Dorfman |
| 5,629,678 A | 5/1997 | Gargano et al. |
| 5,657,010 A | 8/1997 | Jones |
| 5,668,543 A | 9/1997 | Jones |
| 5,671,158 A | 9/1997 | Fournier et al. |
| 5,680,328 A | 10/1997 | Skorupski et al. |
| 5,610,596 A | 11/1997 | Petitclerc |
| 5,719,771 A | 2/1998 | Buck et al. |
| 5,731,893 A | 3/1998 | Dominique |
| 5,732,074 A | 3/1998 | Spaur et al. |
| 5,742,915 A | 4/1998 | Stafford |
| 5,745,049 A | 4/1998 | Akiyama et al. |
| 5,758,299 A | 5/1998 | Sandborg et al. |
| 5,758,300 A | 5/1998 | Abe |
| 5,781,871 A | 7/1998 | Mezger et al. |
| 5,808,565 A | 9/1998 | Matta et al. |
| 5,809,437 A | 9/1998 | Breed |
| 5,815,071 A | 9/1998 | Doyle |
| 5,835,871 A | 10/1998 | Smith et al. |
| 5,794,164 A | 11/1998 | Beckert et al. |
| 5,837,945 A * | 11/1998 | Cornwell ................. B65F 3/04 177/136 |
| 5,838,251 A | 11/1998 | Brinkmeyer et al. |
| 5,839,112 A | 11/1998 | Schreitmueller et al. |
| 5,867,404 A | 2/1999 | Bryan |
| 5,874,891 A | 2/1999 | Lowe |
| 5,884,202 A | 3/1999 | Arjomand |
| 5,890,061 A | 3/1999 | Timm et al. |
| 5,890,520 A | 6/1999 | Johnson, Jr. |
| 5,913,180 A | 6/1999 | Ryan |
| 5,922,037 A | 7/1999 | Potts |
| 5,923,572 A | 7/1999 | Pollock |
| 5,942,753 A | 8/1999 | Dell |
| 5,956,259 A | 9/1999 | Hartsell, Jr. et al. |
| 5,995,898 A | 11/1999 | Tuttle |
| 6,006,159 A | 12/1999 | Schmier et al. |
| 6,009,355 A | 12/1999 | Obradovich et al. |
| 6,009,363 A | 12/1999 | Beckert et al. |
| 6,016,795 A | 1/2000 | Ohki |
| 6,024,142 A | 2/2000 | Bates |
| 6,025,776 A | 2/2000 | Matsuura |
| 6,043,661 A | 3/2000 | Gutierrez |
| 6,127,947 A | 3/2000 | Uchida et al. |
| 6,128,551 A | 3/2000 | Davis et al. |
| 6,054,950 A | 4/2000 | Fontana |
| 6,061,614 A | 5/2000 | Carrender et al. |
| 6,064,299 A | 5/2000 | Lesesky et al. |
| 6,070,156 A | 5/2000 | Hartsell, Jr. |
| 6,078,255 A | 6/2000 | Dividock et al. |
| 6,084,870 A | 7/2000 | Wooten et al. |
| 6,092,021 A | 7/2000 | Ehlbeck et al. |
| 6,107,915 A | 8/2000 | Reavell et al. |
| 6,107,917 A | 8/2000 | Carrender et al. |
| 6,112,152 A | 8/2000 | Tuttle |
| 6,128,959 A | 10/2000 | McGovern et al. |
| 6,169,938 B1 | 2/2001 | Hartsell, Jr. |
| 6,169,943 B1 | 2/2001 | Simon |
| 6,202,008 B1 | 3/2001 | Beckert et al. |
| 6,208,948 B1 | 3/2001 | Klingler et al. |
| 6,256,579 B1 | 3/2001 | Tanimoto |
| 6,285,953 B1 | 4/2001 | Harrison et al. |
| 6,236,911 B1 | 5/2001 | Kruger |
| 6,240,365 B1 | 5/2001 | Bunn |
| 6,199,099 B1 | 6/2001 | Gershman et al. |
| 6,253,129 B1 | 6/2001 | Jenkins et al. |
| 6,263,273 B1 | 7/2001 | Henneken et al. |
| 6,263,276 B1 | 7/2001 | Yokoyama et al. |
| 6,278,936 B1 | 8/2001 | Jones |
| 6,295,492 B1 | 9/2001 | Lang et al. |

(56) References Cited

U.S. PATENT DOCUMENTS

| | | |
|---|---|---|
| 6,259,358 B1 | 10/2001 | Fjordbotten |
| 6,313,760 B1 | 11/2001 | Jones |
| 6,313,791 B1 | 11/2001 | Klanke |
| 6,330,499 B1 | 11/2001 | Chou et al. |
| 6,339,745 B1 | 1/2002 | Novik |
| 6,362,730 B2 | 3/2002 | Razavi et al. |
| 6,370,454 B1 | 4/2002 | Moore |
| 6,374,176 B1 | 4/2002 | Schmier et al. |
| 6,396,413 B2 | 5/2002 | Hines et al. |
| 6,411,203 B1 | 6/2002 | Leseskey et al. |
| 6,411,891 B1 | 6/2002 | Jones |
| 6,417,760 B1 | 7/2002 | Mabuchi et al. |
| 6,438,472 B1 | 8/2002 | Tano et al. |
| 6,450,411 B1 | 9/2002 | Rash et al. |
| 6,456,039 B1 | 9/2002 | Lauper et al. |
| 6,502,030 B2 | 12/2002 | Hilleary |
| 6,505,106 B1 | 1/2003 | Lawrence et al. |
| 6,507,810 B2 | 1/2003 | Razavi et al. |
| 6,614,392 B2 | 2/2003 | Howard |
| 6,539,296 B2 | 3/2003 | Diaz et al. |
| 6,529,723 B1 | 4/2003 | Bentley |
| 6,529,808 B1 | 4/2003 | Diem |
| 6,604,033 B1 | 5/2003 | Banet et al. |
| 6,594,579 B1 | 7/2003 | Lowrey et al. |
| 6,594,621 B1 | 7/2003 | Meeker |
| 6,597,973 B1 | 7/2003 | Barich et al. |
| 6,608,554 B2 | 8/2003 | Leseskey et al. |
| 6,609,082 B2 | 8/2003 | Wagner |
| 6,616,036 B2 | 9/2003 | Streicher et al. |
| 6,621,452 B2 | 9/2003 | Knockeart et al. |
| 6,636,790 B1 | 10/2003 | Lightner et al. |
| 6,664,897 B2 | 12/2003 | Pape et al. |
| 6,671,646 B2 | 12/2003 | Manegold et al. |
| 6,680,694 B1 | 1/2004 | Knockeart et al. |
| 6,683,542 B1 | 1/2004 | Jones |
| 6,744,352 B2 | 1/2004 | Lesesky et al. |
| 6,700,506 B1 | 3/2004 | Winkler et al. |
| 6,708,113 B1 | 3/2004 | Von Gerlach et al. |
| 6,714,859 B2 | 3/2004 | Jones |
| 6,727,818 B1 | 4/2004 | Wildman et al. |
| 6,732,031 B1 | 5/2004 | Lightner et al. |
| 6,732,032 B1 | 5/2004 | Banet et al. |
| 6,801,841 B2 | 5/2004 | Tabe |
| 6,754,183 B1 | 6/2004 | Razavi et al. |
| 6,768,994 B1 | 7/2004 | Howard et al. |
| 6,816,762 B2 | 9/2004 | Hensey et al. |
| 6,804,606 B2 | 12/2004 | Jones |
| 6,804,626 B2 | 12/2004 | Manegold et al. |
| 6,834,259 B1 | 12/2004 | Markwitz et al. |
| 6,856,820 B1 | 2/2005 | Kolls |
| 6,924,750 B2 | 2/2005 | Flick |
| 6,876,642 B1 | 4/2005 | Adams et al. |
| 6,880,390 B2 | 4/2005 | Emord |
| 6,952,645 B1 | 4/2005 | Jones |
| 6,894,617 B2 | 5/2005 | Richman |
| 6,899,151 B1 | 5/2005 | Latka et al. |
| 6,904,359 B2 | 6/2005 | Jones |
| 6,909,947 B2 | 6/2005 | Douros et al. |
| 6,972,668 B2 | 6/2005 | Schauble |
| 6,919,804 B1 | 7/2005 | Cook et al. |
| 6,928,348 B1 | 9/2005 | Lightner et al. |
| 6,946,953 B2 | 9/2005 | Lesesky et al. |
| 6,957,133 B1 | 10/2005 | Hunt et al. |
| 6,958,701 B1 | 10/2005 | Storkamp et al. |
| 6,879,894 B1 | 12/2005 | Lightner et al. |
| 6,988,033 B1 | 1/2006 | Lowrey et al. |
| 7,117,121 B2 | 3/2006 | Brinton et al. |
| 7,048,185 B2 | 5/2006 | Hart et al. |
| 7,080,778 B1 | 7/2006 | Kressin et al. |
| 7,103,460 B1 | 9/2006 | Breed |
| 7,113,127 B1 | 9/2006 | Banet et al. |
| 7,027,955 B2 | 11/2006 | Markwitz et al. |
| 7,155,199 B2 | 12/2006 | Zalewski et al. |
| 7,225,065 B1 | 5/2007 | Hunt et al. |
| 7,174,243 B1 | 6/2007 | Lightner et al. |
| 7,174,277 B2 | 6/2007 | Vock et al. |
| 7,228,211 B1 | 6/2007 | Lowrey et al. |
| 7,254,516 B2 | 7/2007 | Case, Jr. et al. |
| 7,362,229 B2 | 4/2008 | Brinton et al. |
| 7,447,574 B1 | 4/2008 | Ivashicko et al. |
| 7,343,252 B2 | 11/2008 | Wiens |
| 7,477,968 B1 | 1/2009 | Lowrey et al. |
| 7,480,551 B1 | 1/2009 | Lowrey et al. |
| 7,523,159 B1 | 4/2009 | Williams et al. |
| 7,564,375 B2 | 7/2009 | Brinton et al. |
| 7,596,437 B1 | 9/2009 | Hunt et al. |
| 7,604,169 B2 | 10/2009 | Demere |
| 7,532,962 B1 | 12/2009 | Lowrey et al. |
| 7,532,963 B1 | 12/2009 | Lowrey et al. |
| 7,640,185 B1 | 12/2009 | Giordano et al. |
| 7,650,210 B2 | 1/2010 | Breed |
| 7,672,756 B2 | 2/2010 | Breed |
| 7,672,763 B1 | 2/2010 | Hunt et al. |
| 7,680,595 B2 | 3/2010 | Brinton et al. |
| 7,778,752 B1 | 8/2010 | Hunt et al. |
| 8,378,854 B1 | 2/2013 | Sills |
| 2001/0037174 A1 | 11/2001 | Dickerson |
| 2001/0047283 A1 | 11/2001 | Melick et al. |
| 2001/0053983 A1 | 12/2001 | Reichwein et al. |
| 2002/0016655 A1 | 2/2002 | Joao |
| 2002/0022979 A1 | 2/2002 | Whipp et al. |
| 2002/0022984 A1 | 2/2002 | Daniel et al. |
| 2002/0030595 A1* | 3/2002 | Kasik .................. B65F 1/14 340/568.1 |
| 2002/0049054 A1 | 4/2002 | O'Connor et al. |
| 2002/0057212 A1 | 5/2002 | Hamilton et al. |
| 2002/0065698 A1 | 5/2002 | Schick et al. |
| 2002/0069017 A1 | 6/2002 | Schmier |
| 2002/0070882 A1 | 6/2002 | Jones |
| 2002/0089434 A1 | 7/2002 | Ghazarian |
| 2002/0099500 A1 | 7/2002 | Schmier et al. |
| 2002/0163449 A1 | 7/2002 | Flick |
| 2002/0104013 A1 | 8/2002 | Ghazarian |
| 2002/0107833 A1 | 8/2002 | Kerkinni |
| 2002/0107873 A1 | 8/2002 | Winkler et al. |
| 2002/0111725 A1 | 8/2002 | Burge |
| 2002/0122583 A1 | 9/2002 | Thompson |
| 2002/0133273 A1 | 9/2002 | Lowrey et al. |
| 2002/0133275 A1 | 9/2002 | Thibault |
| 2002/0147610 A1 | 10/2002 | Tabe |
| 2002/0150050 A1 | 10/2002 | Nathanson |
| 2002/0156558 A1 | 10/2002 | Hanson et al. |
| 2002/0178147 A1 | 11/2002 | Arroyo et al. |
| 2002/0188593 A1 | 12/2002 | Moser et al. |
| 2003/0004644 A1 | 1/2003 | Farmer |
| 2003/0030550 A1 | 2/2003 | Talbot |
| 2003/0033061 A1 | 2/2003 | Chen et al. |
| 2003/0120745 A1 | 6/2003 | Katagishi et al. |
| 2003/0206133 A1 | 11/2003 | Cheng |
| 2003/0109973 A1 | 12/2003 | Hensey et al. |
| 2003/0233190 A1 | 12/2003 | Jones |
| 2004/0009819 A1 | 1/2004 | Koga |
| 2004/0083054 A1 | 4/2004 | Jones |
| 2004/0236596 A1 | 11/2004 | Chowdhary et al. |
| 2005/0038572 A1* | 2/2005 | Krupowicz ........... B65F 1/1484 700/305 |
| 2005/0156759 A1 | 7/2005 | Aota |
| 2005/0203683 A1 | 9/2005 | Olsen et al. |
| 2005/0273250 A1 | 12/2005 | Hamilton et al. |
| 2006/0006228 A1 | 1/2006 | Poulter |
| 2006/0011721 A1 | 1/2006 | Olsen et al. |
| 2006/0055564 A1 | 3/2006 | Olsen et al. |
| 2006/0095277 A1 | 5/2006 | Noonan et al. |
| 2006/0097896 A1 | 5/2006 | Jones |
| 2006/0145837 A1 | 7/2006 | Horton et al. |
| 2006/0202030 A1 | 9/2006 | Kressin et al. |
| 2006/0208075 A1 | 9/2006 | Kressin et al. |
| 2006/0208087 A1 | 9/2006 | Kressin et al. |
| 2006/0232406 A1 | 10/2006 | Filibeck |
| 2006/0280582 A1* | 12/2006 | Kouri .................. B65F 3/043 414/408 |
| 2007/0040672 A1 | 2/2007 | Chinigo |
| 2007/0069947 A1 | 3/2007 | Banet et al. |

(56) References Cited

U.S. PATENT DOCUMENTS

| | | | |
|---|---|---|---|
| 2007/0172340 A1* | 7/2007 | Curotto | B65F 1/122 414/408 |
| 2007/0179709 A1 | 8/2007 | Doyle | |
| 2007/0262878 A1* | 11/2007 | Maruca | G06Q 10/06 340/686.1 |
| 2008/0140253 A1* | 6/2008 | Brown | B65F 1/1638 700/245 |
| 2008/0154489 A1 | 6/2008 | Kaneda et al. | |
| 2008/0154712 A1 | 6/2008 | Wellman | |
| 2008/0314263 A1* | 12/2008 | Martin | B30B 9/3046 100/102 |
| 2008/0319665 A1 | 12/2008 | Berkobin et al. | |
| 2009/0177350 A1 | 7/2009 | Williams et al. | |
| 2009/0222200 A1 | 9/2009 | Link, II et al. | |
| 2009/0069999 A1 | 12/2009 | Bos | |
| 2010/0088127 A1 | 8/2010 | Betancourt et al. | |
| 2010/0278620 A1* | 11/2010 | Rimsa | B65F 1/122 414/408 |
| 2011/0068954 A1 | 3/2011 | McQuade et al. | |
| 2011/0116899 A1* | 5/2011 | Dickens | B65F 3/048 414/21 |
| 2011/0316689 A1* | 12/2011 | Reyes | B65F 1/1484 340/532 |
| 2016/0210370 A1 | 7/2016 | McQuade et al. | |
| 2016/0350567 A1 | 12/2016 | McQuade et al. | |
| 2018/0260595 A1 | 9/2018 | McQuade et al. | |
| 2018/0314865 A1 | 11/2018 | McQuade | |

FOREIGN PATENT DOCUMENTS

| | | |
|---|---|---|
| CA | 2388572 | 5/2001 |
| EP | 0755039 | 1/1997 |
| EP | 0814447 | 12/1997 |
| EP | 0926020 | 6/1999 |
| EP | 1005627 | 6/2000 |
| EP | 1027792 | 8/2000 |
| EP | 1067498 | 1/2001 |
| EP | 1271374 | 5/2004 |
| EP | 2116968 | 11/2009 |
| JP | 60-204071 A | 10/1985 |
| JP | 11-327628 A | 11/1999 |
| JP | 2002-96913 A | 4/2002 |
| JP | 2003-85471 A | 3/2003 |
| WO | WO97026750 | 7/1997 |
| WO | WO98003952 | 1/1998 |
| WO | WO98030920 | 7/1998 |
| WO | WO03023550 | 3/2003 |
| WO | WO07092711 | 8/2007 |

OTHER PUBLICATIONS

"Detex Announces the Latest Innovation in Guard Tour Verification Technology." Detex Life Safety, Security and Security Assurance. Jan. 1, 2003. 1pp. © 2002-2004 Detex Corporation. <http://www.detex.com/NewsAction.jspa?id=3>.
"Nextel, Motorola and Symbol Technologies Offer First Wireless Bar Code Scanner for Mobile Phones." Jun. 11, 2003. <http://theautochannel.com/news/2003/06/11/162927 .htm>.
"OBD Up." MOTOR: 28-34, Jul. 1998.
"The Data Acquisition Unit Escorte." The Proxi Escort.com. Nov. 20, 2001. 4pp. Copyright © 2000 GCS General control Systems. <http://www.gcs.at/eng/produkte/hw/escorte.htm>.
"The PenMaster" and "The PSION Workabout." Copyright 2000 GCS General Control Systems. <http://www.gcs.at/eng/produkte/hw/penmaster.htm>.
"Tracking out of route: software helps fleets compare planned routes to actual miles. (Technology)." Commercial Carrier Journal. Published Oct. 1, 2005. 4pp. NDN-219-1054-1717-0.
"Transit agency builds GIS to plan bus routes." American City & County. vol. 118, No. 4. Published Apr. 1, 2003. 4pp. NDN-258-0053-0664-6.
"What is the Child Check-Mate Safety System"? 2002 © Child Checkmate Systems Inc. <http://www. childcheckmate.com/what.html>.
Albright, Brian: "Indiana Embarks on Ambitious RFID roll out." Frontline Solutions. May 20, 2002; 2pp. Available at: (http://www.frontlinetoday .com/frontline/ article/articleDetailjsp?id= 19358>.
Contact: GCS (UK), Tewkesbury Gloucestershire. Dec. 11, 2002. 2pp. Copyright © 2000 GCS General Control Systems < http://www.gcs.at?eng/news allegemein.htm>.
Dwyer, H.A., et al. Abstract: "Analysis of the Performance and Emissions of Different Bus Technologies on the city of San Francisco Routes." Technical paper published by Society of Automotive Engineers, Inc. Published Oct. 26, 2004. 2pp. NDN-116-0014-3890-6.
Guensler et al., "Development of a Comprehensive Vehicle Instrumentation Package for Monitoring Individual Tripmaking Behavior." Georgia Institute of Technology: School of Civil and Environmental Engineering: 31pp., Feb. 1999.
Jenkins et al., "Real-Time Vehicle Performance Monitoring Using Wireless Networking." IASTED International conference on Communications, Internet, and Information Technology: 375-380, Nov. 22-24, 2004.
Kurtz, Jennifer. "Indiana's E-Government: A Story Behind It's Ranking." Incontext Indiana; s Workforce and Economy. Jan.-Feb. 2003 vol. 4, No. 5pp. Available at <http://www.incontext.indiana.edu/2003/jan-feb03/govemement.html>.
Kwon, W., "Networking Technologies ofIn-Vehicle." Seoul National University: School of electrical engineering: 44pp., Mar. 8, 2000.
Leavitt, Wendy., "The Convergence Zone." FleetOwner, 4pp. <www.driversmag.com/ar/fleet_convergence_zone! index.html> 1998.
Miras. "About SPS Technologies." 1pg., May 7, 1999.
Miras. "How MIRAS Works." 1pg., Apr. 29, 1999.
Miras. "Miras 4.0 Screenshot." 1pg., May 7, 1999. Miras. "MIRAS Unit." 1pg., May 4, 1999.
Miras. "Monitoring Vehicle Functions." 1pg., Apr. 27, 1999 Miras. "Remote Control." 1pg., Apr. 29, 1999.
Miras. "Tracking & Monitoring Software." 1pg., Apr. 29, 1999.
N.a., "MIRAS GPS vehicle tracking using the Internet." Business Wire, 2pp., Nov. 22, 1996.
N.a., "Private fleets moving to wireless communications." FleetOwner, 4pp. <www.driversmag.com/ar/fleet_private _fleets_moving/index.html> 1997.
Quaan et al., "Guard Tour Systems." Security Management Online. Sep. 16, 2003. 1pg. © 2000 <http://www.securitymanagement.com/ubb/Forum30/HTML/000066.html>.
Qualcomm. "Object FX Integrates TrackingAdvisor with QUALCOMM's FleetAdvisor System; Updated Version Offers Benefit of Visual Display of Vehicles and Routes to Improve Fleet Productivity." Source: Newswire. Published Oct. 27, 2003. 4pp. NDN-121-0510-3002-5.
Senger, Nancy. "Inside RF/ID: Carving a Niche Beyond Asset Tracking." Business Solutions. Feb. 1999: 5pp. Available at: <http://www.businesssolutionsmag.com/ Articles/1999 _02/990208 .html>.
Sterzbach et al., "A Mobile Vehicle On-Board Computing and Communication System." Comput. & Graphics, vol. 20, No. 4: 659-667, 1996.
Tiscor: Inspection Manager 6.0 User Guide. USA; 2004. 1-73.
Tiscor: The Mobile Software Solutions Provider. Inspection Manager: An Introduction. Sep. 27, 2004. Slide presentation; 19pp. Available: www.TISCOR.com.
Tsakiri, M et al. Abstract: "Urban fleet monitoring with GPS and GLONASS." Journal of Navigation, vol. 51, No. 3. Published Sep. 1998. 2pp. NDN-174-0609-4097-3.
Tuttle, John R. "Digital RF/ID Enhances GPS" Proceedings of the Second Annual Wireless Symposium, pp. 406-411, Feb. 15-18, 1994, Santa Clara, CA.
Want, Roy, "RFIDA Key to Automating Everything." Scientific American, Jan. 2004, p. 58-65.
Zujkowski, Stephen. "Savi Technolgy, Inc: Savi Security and Productivity Systems." ATA Security Forum 2002, Chicago, IL: 21pp., May 15, 2002.

\* cited by examiner

METHOD AND SYSTEM FOR COLLECTING OBJECT ID DATA WHILE COLLECTING REFUSE FROM REFUSE CONTAINERS

RELATED APPLICATIONS

This application is a continuation of prior co pending application Ser. No. 15/235,853, filed Aug. 12, 2016, which is itself a continuation of Ser. No. 15/083,208, filed Mar. 28, 2016, and issued as U.S. Pat. No. 9,858,462 on Jan. 2, 2018, which itself is a continuation of application Ser. No. 12/942,874, filed Nov. 9, 2010, the benefit of the filing date of which is hereby claimed under 35 U.S.C. § 120.

BACKGROUND

As the cost of sensors, communications systems and navigational systems has dropped, operators of commercial and fleet vehicles now have the ability to collect a tremendous amount of data about the vehicles that they operate, including geographical position data collected during the operation of the vehicle.

Vehicle fleet operators often operate vehicles along predefined and generally invariant routes. For example, buses frequently operate on predefined routes, according to a predefined time schedule (for example, along a route that is geographically, as well as temporally defined). Migrating route data from one software platform to another software platform can be a tedious task.

It would be desirable to provide such fleet operators with additional tools for moving data between different software platforms, and for collecting and analyzing data (such as Global Positioning System (GPS) data, as well as other route related data) collected from vehicles traversing a predefined route.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One concept disclosed herein is the collection of object identification data during the operation of a vehicle, where the vehicle interacts with the object at a definable geographical position. An identification sensor is coupled to a geographical position sensor, and whenever an object is identified a record is generated, the record including the identification of the object, the position of the vehicle when the interaction between the object and the vehicle occurs, and the time of the interaction. Exemplary (but not limiting) objects that are identified include passengers, containers (such as pallets, packages, boxes, envelopes), and documents. Many different types of interactions are possible, including, but not limited to, loading an object (such as a parcel, document, or container) into the vehicle, unloading an object (such as a parcel, document, or container) from the vehicle, boarding a passenger (the object) onto the vehicle, unloading a passenger (once again, the passenger being the object) from the vehicle, transferring a bulk material (such as a solid, liquid or compressed gas) from the vehicle into a specific container (the container being the object), and/or transferring a bulk material (such as a solid, liquid or compressed gas) from a specific container (the container being the object) to the vehicle. The record may also include additional data about a parameter of the object (for example, in some embodiments, it will be useful to include the object's weight in the record, or the weight/volume of a material being transferred to or from the vehicle to a specific container). Such a data record is referred to herein and in the claims that follow as object identification (ID) and location data, and/or object ID encoded position data (encoded in the sense that the object data is combined with the position data). In some embodiments, the object ID and location data is stored at the vehicle for transfer to a remote computing device at a later time, and in other embodiments, the object ID and location data is wirelessly transmitted to a remote computing device during operation of the vehicle. The term "object identification data" is intended to refer to data that identifies an object with which a vehicle interacts. For example, for a passenger, object identification data can include the passenger's name, or a passenger number (or an alphanumeric code or other type of code) that uniquely identifies an individual. For other objects, the object identification data is generally a numeric or alphanumeric code that uniquely identifies the object.

Broadly speaking, position data from the vehicle is collected as the vehicle travels to the plurality of different locations, the position data identifying a specific geographical location of the vehicle at a specific point in time (thus, the vehicle position data is time indexed). Time indexed object identification data is collected as the vehicle interacts with objects at various locations visited by the vehicle. In some embodiments, the vehicle traverses a generally invariant route (such as a bus route), while in other embodiments the vehicle traverses a variable route (such as a parcel delivery vehicle). In an exemplary embodiment, the time indexing function is implemented by the geographical position sensing system. Periodically, the geographical position sensing system generates a record that documents the current time and current geographical position of the vehicle. Whenever the identification sensor identifies an object, the identification data is sent to the geographical position sensing system, which either appends the identification data to the most current record, or generates a new record that documents the identity of the object, the current time and the current geographical position, thereby generating the object ID and location data. It should thus be recognized that the set of location data collected by the geographical position sensing system during operation of the vehicle will also include object identification data at those points in time at which the vehicle interacts with an object that has been tagged in some way with a unique identifier that can be detected by the object identification sensor. Exemplary tags or tokens include optical codes (such as bar codes and other optically recognizable codes), radio frequency identification (RFID) tags, and magnetic tags/magnetic strips. It should be understood that the set of location data collected by the geographical position sensing system during operation of the vehicle (which at some time points includes only location data, and at other time points includes location data and object identification data) is collectively referred to herein as the object ID and location data. Such object ID and location data are conveyed to a remote computing device for storage/processing, either in real-time (i.e., while the vehicle is being operated, such that the vehicle requires a transmitter to convey the data to the remote computing device) or at some point after the vehicle has traversed a route and collected the different types of data (the position data and the object identification data). The term real-time is not intended to imply the data is transmitted instantaneously, rather the data is collected over a relatively short period of time (over a period of seconds or minutes), and transmitted to the remote computing device on a ongoing basis, as opposed to storing the data at the vehicle for an extended period of time (hour or days), and transmitting an extended data set to the remote computing device after the data set has been collected. Transmitting the object ID and location data at a later time, rather than in real time, is encompassed by the concepts disclosed herein, although real-time data transmission is likely to be popular with users. Note that transferring the object ID and location data at a later time can be achieved without requiring the vehicle to include a wireless transmitter (i.e., the object ID and location data can be transferred via a hardwire connection to either the remote computing device or an intermediate data collection device that is coupled to the vehicle to extract the object ID and location data, which is then conveyed to remote computing device).

With respect to the remote computing device, in a preferred but not limiting embodiment, the time indexed object ID and location data are available in a networked computing environment. In at least one embodiment, the object ID and location data are stored by a company offering data management services to its clients, and clients can access the object ID and location data for each of their vehicles.

The object ID and location data will have a number of uses. In the context of objects being passengers, the object ID and location data can be used by school bus operators to provide parents with data about when and where their children entered and exited a school bus. The object ID and location data can also be used to alert drivers when students attempt to get off the bus at some location other than their normal stop. The object ID and location data can be used to provide proof of delivery (or pick up) of parcels, documents, and other objects. Historical object ID and location data for generally invariant routes (such as refuse collection routes and school bus routes) can be used to train new drivers, where historical object ID and location data is loaded onto the vehicle before the route is traversed, and that data is used to alert the driver of what objects (such as refuse containers or students) are associated with specific geographical locations in the route.

In addition to being implemented as a method, the concepts disclosed herein can also be implemented as a non-transitory memory medium storing machine instructions that when executed by a processor implement the method, and by a system for implementing the method. In such a system, the basic elements include a vehicle that is to be operated by a vehicle operator, a position data collection unit (such as a GPS tracking device), an object identification sensor (such as a token reader), a data link (which can be integrated into the GPS unit), and a remote computing device. In general, the remote computing device can be implemented by a computing system employed by an entity operating a fleet of vehicles. Entities that operate vehicle fleets can thus use such computing systems to track and process data relating to their vehicle fleet. It should be recognized that these basic elements can be combined in many different configurations to achieve the exemplary method discussed above. Thus, the details provided herein are intended to be exemplary, and not limiting on the scope of the concepts disclosed herein.

Identification of objects can be accomplished by a using reader to scan a token attached to the object. Exemplary tokens include optical codes (such as bar codes), radio frequency identification tags (RFID), and magnetic strips. Readers can be handheld devices, or when appropriate can be attached to the vehicle. For example, RFID tags readers could be attached to the vehicle proximate a door used to load or unload the vehicle, to automatically interrogate each RFID tagged item loaded onto or unloaded from the vehicle. Generally it will be preferable to record both loading and unloading of an object, although the concepts disclosed herein encompass embodiments where data relating to only loading or unloading is collected. Where the object is a person (i.e., a passenger), the person will be issued a token to be carried with them as they enter (or exit) the vehicle. In some cases, it may be desirable to identify a person that interacts with the vehicle even if the person is not a passenger (or is not entering or exiting the vehicle). Such a person might be tasked with delivering something to the vehicle or servicing the vehicle.

With respect to identifying passengers, a reader can be used to read a token (such as a ticket or rider pass) when a person enters or exits a vehicle. Generally it will be preferable to record both entry and exit, although the concepts disclosed herein encompass embodiments where data relating to only entry or exit is determined. In an exemplary but not limiting embodiment, a magnetic card reader is used to scan passenger cards as they enter or exit a vehicle. A particularly useful application of this type of object ID and position data tracking is to enable school bus operators to collect ridership data about students, tracking where and when students enter and exit a school bus. Such historical data can be used for training purposes whenever a driver is assigned a new route, as the historical data can be used to teach the driver which children get on and off at a particular stop. Once such historical data has been collected, if desired, the data can be used to prevent children from getting off at an incorrect stop (the token reader will automatically check the historical data, and if that child attempts to get off at a stop that is not part of the historical data for that child, an alert can be issued to the driver).

While the above noted method is preferably implemented by a processor (such as computing device implementing machine instructions to implement the specific functions noted above), note that such a method can also be implemented using a custom circuit (such as an application specific integrated circuit).

In addition to object identification data (i.e., data that uniquely identifies the object), many different types of object data can be collected. The following types of additional object data are intended to be exemplary, rather than limiting. Time indexing can be achieved by including a time stamp with the object data as the data is collected by the object identification sensor, or the time stamp can be provided by the position sensing system, generally as discussed above.

A first type of additional object data that can be collected during operation of the vehicle is a weight of the object. An exemplary embodiment of a vehicle collecting object ID and location data that includes weight is a refuse truck. In this embodiment, each refuse container serviced by the vehicle is tagged with a token that is detected by the identification sensor as the contents of the refuse container is loaded into the vehicle. In an exemplary but not limiting embodiment, the loading arms include an identification sensor that reads a token labeling each container as the containers are manipulated by the loading arms. The loading arms are also equipped with weight sensors, that determines the weight of the refuse emptied from the container. Thus, the object ID and location data in this embodiment can be used to identify when a container was emptied, where the container was located when it was emptied, and how much refuse was removed. That data is collected automatically, and can be used to provide proof of service, and the weight function maybe used for billing purposes if the client is to be billed by weight. Recycling containers can be tracked and weighed in a similar manner. Historical data about containers and position can be used for training purposes whenever a new driver is assigned to an existing route, as the historical data can be used to teach the new driver what containers are usually serviced at a particular location.

A second type of additional object data that can be collected during operation of the vehicle is volume. An exemplary embodiment of a vehicle collecting object ID and location data that includes volume is a liquid fuel or compressed gas delivery truck. In this embodiment, each fuel or gas container serviced by the vehicle is tagged with a token that is detected by the identification sensor as the contents of the truck is offloaded into the container. In an exemplary but not limiting embodiment, the connector used to fluidly couple the vehicle to the container includes an identification sensor that reads a token labeling each container. The identification sensor is coupled to a flow sensor or tank level in the vehicle which keeps track of how much product is delivered. That volume data, as well as the container identification data, is sent to the vehicle's geographical position sensing system as the container is filled. Thus, the object ID and location data in this embodiment can be used to identify when a container was filled, where the container was located when it was filled, and how much volume of product was delivered by the vehicle. That data is collected automatically, and can be used to provide proof of service, and the volume function may be used for billing purposes if the client is to be billed by volume. It should be noted that such liquid or compressed gas deliveries can also be tracked by weight. Related embodiments utilize data input devices to enable vehicle operators to manually enter container identifications and product weights/volumes into a processor or computing device that combines the weight/volume data and container ID data with the vehicle position data to generate the object ID and location data.

A third type of additional object data that can be collected during operation of the vehicle is object temperature. An exemplary embodiment of a vehicle collecting object ID and location data that includes temperature is a produce delivery truck. In an exemplary but not limiting embodiment, the temperature of each produce container delivered by the vehicle is measured as the container is loaded or unloaded from the vehicle. That temperature data, as well as the container identification data, is sent to the vehicle's geographical position sensing system as the container is loaded or unloaded. Thus, the object ID and location data in this embodiment can be used to identify when a container was loaded and/or unloaded, where the container/vehicle was located when the container was loaded and/or unloaded, and the temperature of the container. That data is collected, and can be used to provide proof of service, and the temperature function may be used for quality assurance purposes if the client asserts that poor product quality was caused by improper temperature conditions in transit. Related embodiments simply measure the temperature of the cargo area of the vehicle, rather than measuring the temperature of each container.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced drawings. It is intended that the embodiments and figures disclosed herein are to be considered illustrative rather than restrictive.

DETAILED DESCRIPTION OF THE PREFERRED EMBODIMENTS

Figure 1:
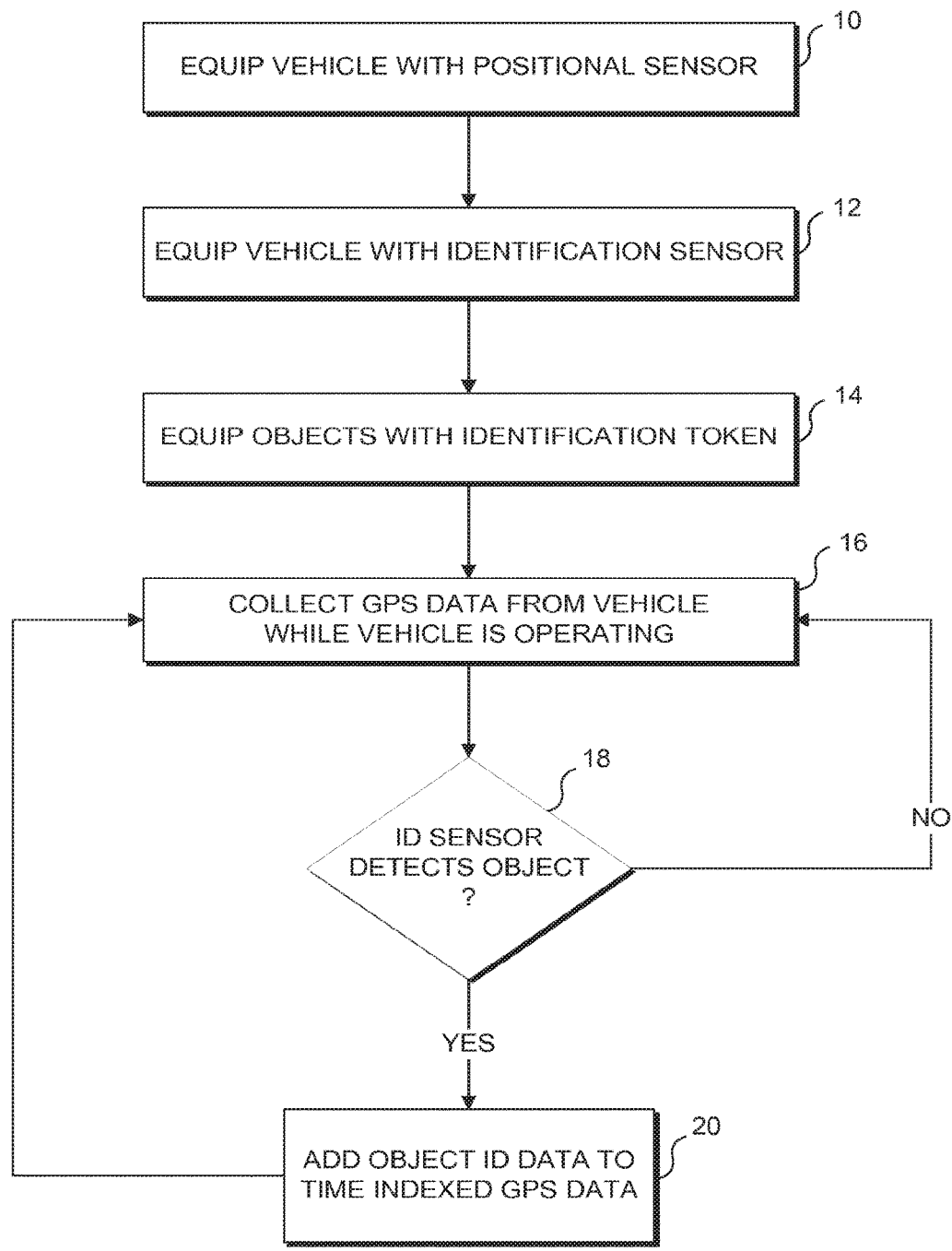
FIG. 1 is a high level logic diagram showing exemplary overall method steps implemented in accord with the concepts disclosed herein to collect time indexed object ID encoded position data.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

FIG. 1 is a high level flow chart showing the overall method steps implemented in accord with one aspect of the concepts disclosed herein, to collect object ID and location data (otherwise referred to herein as object ID encoded position data). In a block 10, a vehicle is equipped with geographical position sensors (such as a GPS unit), so that geographical position data can be collected when the vehicle is being operated. In a block 12, the vehicle is equipped with an object identification sensor capable of uniquely identifying labeled objects that interact with the vehicle during operation of the vehicle. In general, the object identification sensor detects or reads a token attached to the object (or carried by the object, where the object is a person). Exemplary, but not limiting, object identification sensors include bar code readers, optical code readers reading optical codes other than simple bar codes, RFID tag readers, and magnetically encoded data readers. Other technologies that enable tokens or unique object labels to be identified are encompassed by the concepts disclosed herein. The object identification sensor can be integrated into the vehicle, integrated into a portion of the vehicle that interacts with the object, or provided as a hand held unit to be operated by the vehicle operator, as well as any combinations thereof. In a block 14, objects that interact with the vehicle are labeled with a token, such as a bar code (or some other type of optical code), an RFID tag, or a magnetically encoded token (such as a magnetic strip used in credit cards). Preferably, the tokens are both unique and relatively inexpensive, such that large numbers of objects can be labeled, without undue expense. The objects can include objects that will be loaded onto or unloaded from the vehicle, such as container (including but not limited to parcels, packages, boxes, barrels, and drums), pallets, mail, letters, documents, and people (who will generally carry a token). The objects can also include objects disposed at locations the vehicle will visit, such as recycling containers, refuse containers, and bulk material storage containers (including but not limited to fuel storage tanks and compressed gas storage tanks).

In a block 16, location data (such as GPS data, recognizing that other location tracking systems are known, and the term GPS is intended to be exemplary of a position tracking system, and not limiting) is collected while the vehicle is in operation. The location data is time indexed, meaning that the location data being collected is the location of the vehicle at a particular point in time. While the vehicle is in operation, and when the object identification sensor detects a labeled object (as indicated by a decision block 18), the object ID data is added to the time indexed GPS data, as indicated by a block 20. In some embodiments, the object identification sensor is always enabled, and detection of labeled objects occurs automatically when the labeled object and the object identification sensor are proximate (or in the case of a magnetic card reader type sensor, when the card is swiped through the reader). In other embodiments, such as with a hand held object identification sensor, the object identification sensor must be enabled by the vehicle operator, and detection of labeled objects occurs when the vehicle operator brings the labeled object and the object identification sensor into proximity of one another.

Figure 2:
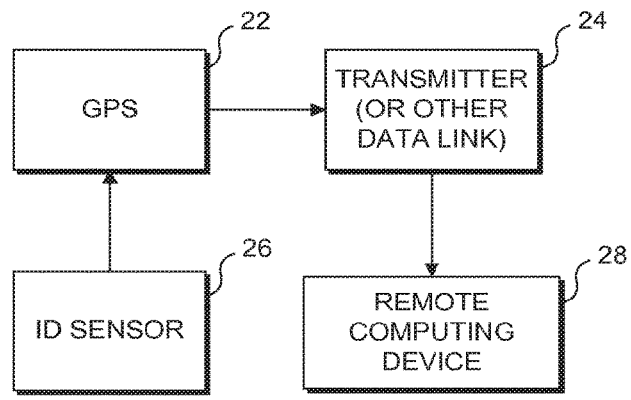
FIG. 2 is an exemplary functional block diagram showing the basic functional components used to implement the method steps of FIG. 1.

FIG. 2 is a schematic block diagram of exemplary functional components that can be employed to implement the method steps of FIG. 1. The components include a GPS unit 22, a transmitter 24, which may also have a corresponding receiver-not shown (or other data link), an object ID sensor 26 and a remote computing device 28 (generally as described above). It should be recognized that many GPS units are available that already incorporate a transmitter, such that a separate transmitter may not be required. It should be understood that the concepts disclosed herein can be used with other types of geographical position sensors/systems, and the use of the term GPS is intended to be exemplary, rather than limiting. It should be understood that GPS unit 22 includes a processor that can accept object ID data from object ID sensor 26, and combine the object ID data with the GPS data, to generate the object ID encoded position data. While not specifically shown, it should be understood that a separate processor (i.e., a processor separate from the GPS unit) can be used to combine the object ID data to generate the object ID encoded position data before the object ID encoded position data is transmitted to the remote computing device with transmitter/data link 24.

Referring once again to FIG. 2, note that power components have not been specifically shown, although it should be understood that such components will be utilized to provide electrical power to the GPS, ID sensor, data link, and remote computer.

Figure 3:
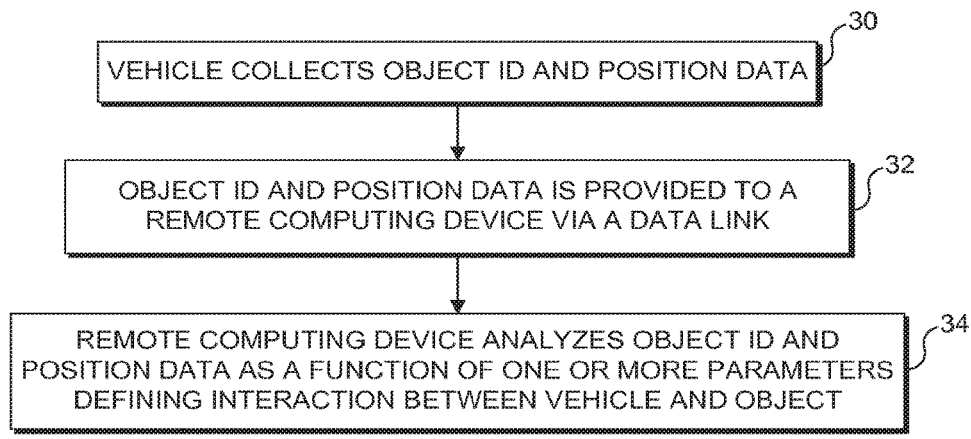
FIG. 3 is a flow chart showing method steps implemented in an exemplary embodiment in which time indexed object ID encoded position data is analyzed to determine at least one parameter of an interaction between a uniquely labeled object and a vehicle.

FIG. 3 is a high level flow chart showing the overall method steps implemented in accord with another exemplary embodiment for using object ID encoded position data collected during operation of a vehicle equipped with an object ID sensor and a GPS sensor. In a block 30, the object ID encoded position data is collected, generally as discussed above in connection with FIG. 1. In a block 32, the object ID encoded position data is transferred from the vehicle to a remote computing device via a data link (such as a hard wired data link, a wireless data link, or a portable memory media). As generally discussed above, other object data (such as weight, volume and/or temperature) can also be added to the object ID encoded position data. In a block 34, the remote computing device (or some other computing device that the object ID encoded position data is transferred to, or some other computing device that is provided access to the object ID encoded position data) is used determine at least one characteristic of an interaction between a labeled object and the vehicle. One such characteristic that can be determined is to identify at what time the vehicle and a specific labeled object interacted, by searching the object ID encoded position data as a function of the specific object. Another such characteristic that can be determined is to identify at what location the vehicle and a specific labeled object interacted, by searching the object ID encoded position data as a function of the specific object. Yet another such characteristic that can be determined is to identify any labeled object that interacted with the vehicle at a specific location, by searching the object ID encoded position data as a function of the specific location. The object ID encoded position data includes time, location, and object identity as minimum elements, and the artisan of ordinary skill will recognize that many different analyses of the object ID encoded position data can be performed by defining one or more of those minimum elements as fixed or variable search parameters. As noted above, in some embodiments the object ID encoded position data will also include additional object data (exemplary types of additional object data include weight, volume, and temperature), and where the object ID encoded position data includes such additional object data, additional search queries of the object ID encoded position data are possible. For example, a billing function could be implemented where weight or volume associated with a specific object are retrieved from the object ID encoded position data and used to bill a client.

Figure 4:
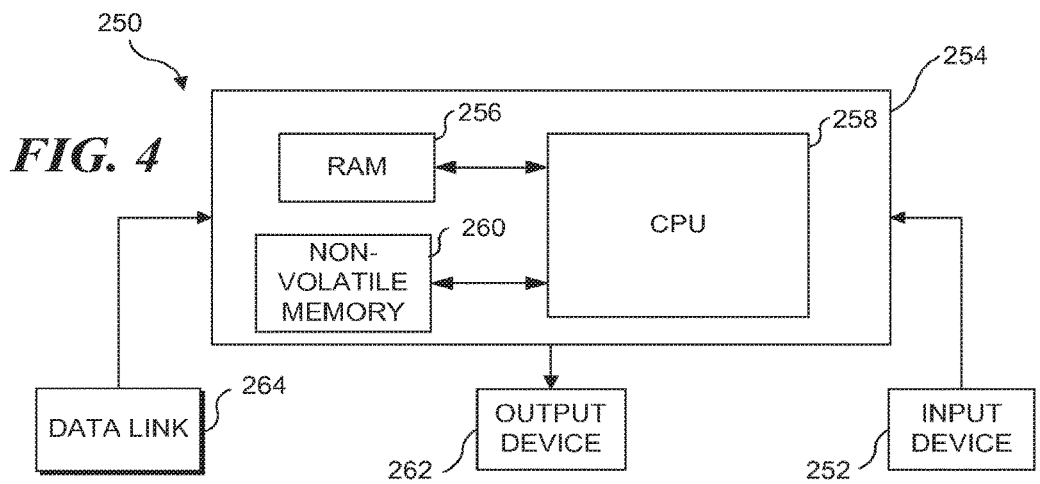
FIG. 4 is a functional block diagram of an exemplary computing device that can be employed to implement some of the method steps disclosed herein.

In general, analysis of the object ID encoded position data will be carried out by a remote computing device. The remote computing device in at least one embodiment comprises a computing system controlled or accessed by the fleet operator. The remote computing device can be operating in a networked environment, and in some cases, may be operated by a third party under contract with the fleet operator to perform such services. FIG. 4 schematically illustrates an exemplary computing system 250 suitable for use in implementing the method of FIG. 3 (i.e., for executing block 34 of FIG. 3). Exemplary computing system 250 includes a processing unit 254 that is functionally coupled to an input device 252 and to an output device 262, e.g., a display (which can be used to output a result to a user, although such a result can also be stored). Processing unit 254 comprises, for example, a central processing unit (CPU) 258 that executes machine instructions for carrying out an analysis of the object ID encoded position data, generally as discussed above. The machine instructions implement functions generally consistent with those described above with respect to block 34 of FIG. 3. CPUs suitable for this purpose are available, for example, from Intel Corporation, AMD Corporation, Motorola Corporation, and other sources, as will be well known to those of ordinary skill in this art.

Also included in processing unit 254 are a random access memory (RAM) 256 and non-volatile memory 260, which can include read only memory (ROM) and may include some form of memory storage, such as a hard drive, optical disk (and drive), etc. These memory devices are bi-directionally coupled to CPU 258. Such storage devices are well known in the art. Machine instructions and data are temporarily loaded into RAM 256 from non-volatile memory 260. Also stored in the non-volatile memory are an operating system software and ancillary software. While not separately shown, it will be understood that a generally conventional power supply will be included to provide electrical power at voltage and current levels appropriate to energize computing system 250.

Input device 252 can be any device or mechanism that facilitates user input into the operating environment, including, but not limited to, one or more of a mouse or other pointing device, a keyboard, a microphone, a modem, or other input device. In general, the input device will be used to initially configure computing system 250, to achieve the desired processing (i.e., analysis of the object ID encoded position data). Configuration of computing system 250 to achieve the desired processing includes the steps of loading appropriate processing software into non-volatile memory 260, and launching the processing application (e.g., loading the processing software into RAM 256 for execution by the CPU) so that the processing application is ready for use. Output device 262 generally includes any device that produces output information, but will most typically comprise a monitor or computer display designed for human visual perception of output. Use of a conventional computer keyboard for input device 252 and a computer display for output device 262 should be considered as exemplary, rather than as limiting on the scope of this system. Data link 264 is configured to enable object ID encoded position data to be input into computing system 250 for subsequent analysis. Those of ordinary skill in the art will readily recognize that many types of data links can be implemented, including, but not limited to, universal serial bus (USB) ports, parallel ports, serial ports, inputs configured to couple with portable memory storage devices, FireWire ports, infrared data ports, wireless data communication such as Wi-Fi and Bluetooth™, network connections via Ethernet ports, and other connections that employ the Internet.

It should be recognized that processors can be implemented as general purpose processors, where the functions implemented by the processor are changeable or customizable using machine instructions (i.e., software). Processors can also be implemented as customized hardware circuits, where the functions implemented are fixed by the design of the circuit (such processors are sometimes referred to as application specific integrated circuits). The flexibility of software controlled processors often results in software based processors being selected over hardware based processors, although it should be understood that the concepts disclosed herein can be implemented using both software based processors and hardware based processors.

Figure 5:
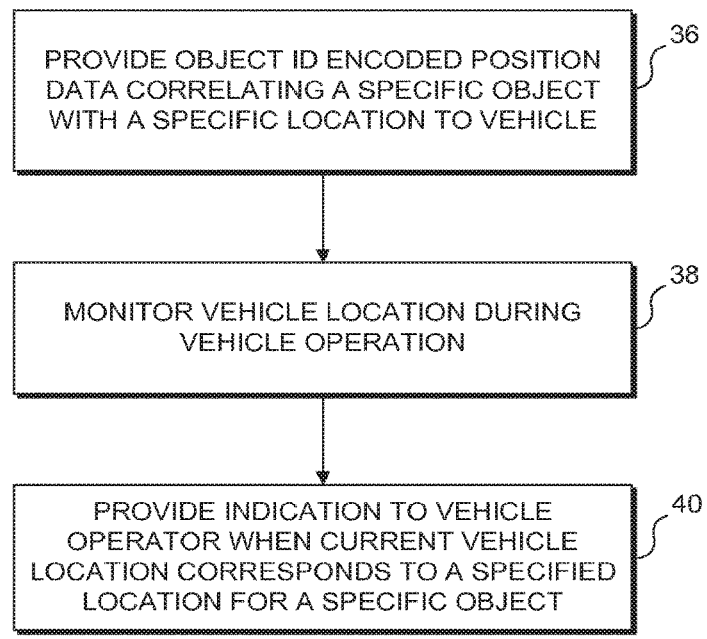
FIG. 5 is a flow chart showing method steps implemented in an exemplary embodiment in which time indexed object ID encoded position data is used to help an operator of a vehicle manage interactions between the vehicle and objects at specified locations.

FIG. 5 is a high level logic diagram showing exemplary overall method steps implemented in accord with the concepts disclosed herein, and summarized in the Summary of invention section above, to utilize object ID encoded position data to facilitate planned interactions between a vehicle and objects as specific geographical positions. Such a technique can be used to enhance such interactions, as well as to train new operators to understand vehicle/object interactions over predefined routes (such as school bus routes, refuse collection routes, and product delivery routes; such routes being exemplary, and not limiting). In a block 36, object ID encoded position data is provided, the object ID encoded position data correlating a specific object with a specific location (and if desired, to a specific time, although time is not a required element in this embodiment). The object ID encoded position data that is provided can be data collected by the vehicle generally as described above in connection with FIG. 1, or can be generated by combining predefined object ID data and position data together (for example, a dispatcher managing a school bus or delivery route could compile the data and ensure the data is provided to the vehicle). As discussed in greater detail below, the provided object ID encoded position data is stored in a memory accessible by the vehicle (or a processor associated with the vehicle) during operation of the vehicle. In a block 38, the current location of the vehicle is monitored (using a GPS unit or equivalent device). In a block 40, the current position of the vehicle is compared to the provided object ID encoded position data, and an indication (such as a display or audile alert, noting that such indications are exemplary, rather than limiting) is provided to the operator of the vehicle whenever the object ID encoded position data indicates that an interaction with a specific object is to occur at the current location of the vehicle. The artisan of ordinary skill will recognize that the indication can be provided as soon as the vehicle approaches an interaction location specified in the object ID encoded position data, to provide the operator of the vehicle reasonable advance notice. The indication will minimally identify the specific object that will interact with the vehicle at the specified location, and may include additional details as necessary to facilitate the interaction. For example, if the interaction is the delivery of a bulk material to a storage tank, the storage tank being the specified object, instructions as to a quantity of bulk material to deliver, or detailed instructions regarding material transfer or accessing the storage tank can be provided.

Figure 6:
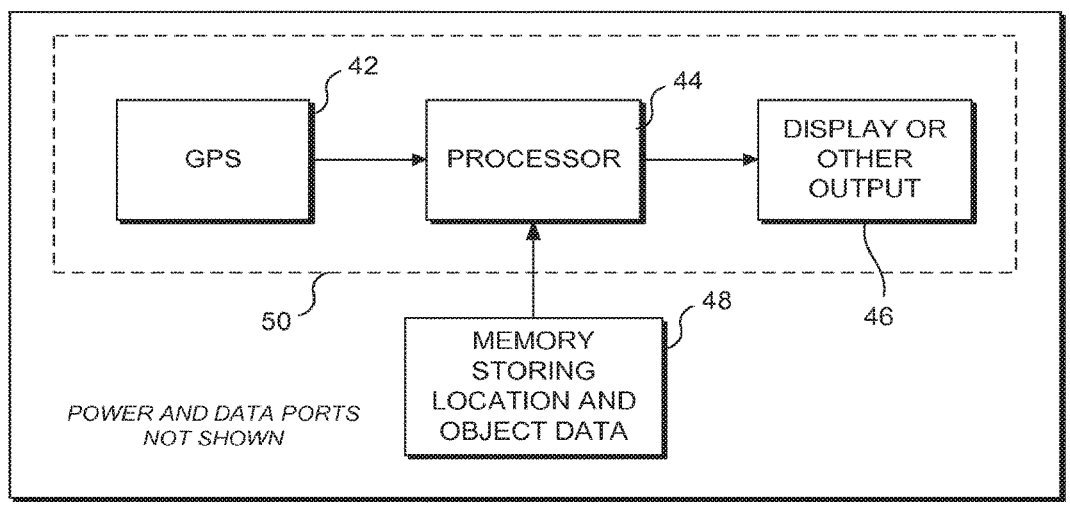
FIG. 6 is an exemplary functional block diagram showing the basic functional components used to implement the method steps of FIG. 5.

FIG. 6 is a functional block diagram of exemplary functional components included in a vehicle employed to implement the method steps of FIG. 5. A vehicle implementing the method includes a GPS unit 42 (which in at least some embodiments, includes a transmitter so that object ID encoded position data collected by the vehicle during its present operational state can be generated and conveyed to a remote computing device, generally as described in connection with FIG. 1, although it should be recognized that a GPS unit without a transmitter can be coupled with a transmitter or other data link to achieve similar functionality; as well as recognizing that the vehicle could be configured to only use object ID encoded position data stored in a memory 48 to facilitate interactions with objects, as being opposed to collecting object ID encoded position data during the current operation cycle of the vehicle as well). GPS unit 42 is coupled to processor 44 (noting that processor 44 may be part of the GPS unit itself, as opposed to a separate device). Processor 44 is also logically coupled to memory 48 (in which object ID encoded position data defining specific locations where interactions with specific objects are expected are stored), as well as a display 46 (or other output device, such as a speaker) used to alert the vehicle operator that the vehicle is approaching or has reached a geographical position where the object ID encoded position data stored in memory 48 indicates an interaction between the vehicle and a specific labeled object is to occur.

As discussed above, the expected interaction can encompass different interactions between the vehicle and a labeled object, including but not limited to, picking up a passenger (where the passenger is the labeled object, or rather carries with them a token that can be read by the identification sensor and thereby uniquely identifies them), dropping off a passenger (where the passenger is the labeled object, or rather carries with them a token that can be read by the identification sensor and thereby uniquely identifies them), picking up an object (such as a parcel, package, container, letter, or document), delivering an object (such as a parcel, package, container, letter, or document), and servicing an object (such as a container or piece of equipment) disposed at the specified location. In particular, servicing an object includes, but is not limited to, removing refuse from a labeled container, removing recyclables from a labeled container, removing refuse from a container at a location that is labeled (i.e., the token is attached to a location where the container is disposed, as opposed to being attached to the container itself), removing recyclables from a container at a location that is labeled (i.e., the token is attached to a location where the container is disposed, as opposed to being attached to the container itself), transferring a bulk material (such as a solid material, a liquid, or a compressed gas) to a labeled container, transferring a bulk material (such as a solid material, a liquid, or a compressed gas) to a container at a location that is labeled (i.e., the token is attached to a location where the container is disposed, as opposed to being attached to the container itself), transferring a bulk solid material to a location that is labeled (i.e., the token is attached to a location, and there is no container, the bulk solid material simply being delivered to the location), and having the vehicle operator perform a service call on a piece of equipment or a structure at the specified location, where either or both the object being serviced or the location is labeled with a token. Those of ordinary skill in the art will recognize that the servicing of structures and/or equipment encompasses services performed by skilled tradesmen, including, but not limited to, plumbers, electricians, carpenters, technicians specializing in servicing specific types of equipment (including but not limited to computers, heating and ventilation equipment, construction equipment, and vehicles), and technicians responsible for other types of repair and maintenance functions.

In an exemplary, but not limiting embodiment, display 46 is used to inform the vehicle operator that the vehicle is approaching or has arrived at a location where an interaction between the vehicle and a labeled object (or labeled location, as noted above) is expected. The display will minimally identify the object, and in some embodiments can be used to provide more detailed information about the interaction. For example, where the interaction is a service call, details about the specific service required may be provided (i.e., replace a faulty component in a piece of equipment, or perform a specific type of scheduled maintenance on a piece of equipment, such services being exemplary and not limiting).

A dashed block 50 around GPS 42, processor 44, and display 46 is intended to indicate that in some embodiments, those three elements will be combined into a single device. It should be recognized that the concepts disclosed herein encompass the use of individual devices to implement each of GPS 42, processor 44, and display 46, as well embodiments where the functions of one or more of GPS 42, processor 44, and display 46 (and memory 48) are implemented by a common device.

Referring once again to FIG. 6, data link and power components have not been specifically shown, although it should be understood that such components will be utilized to provided electrical power to the GPS, processor, display and memory, and some type of data link will be used to load the previously generated object ID encoded position data into the memory.

Figure 7:
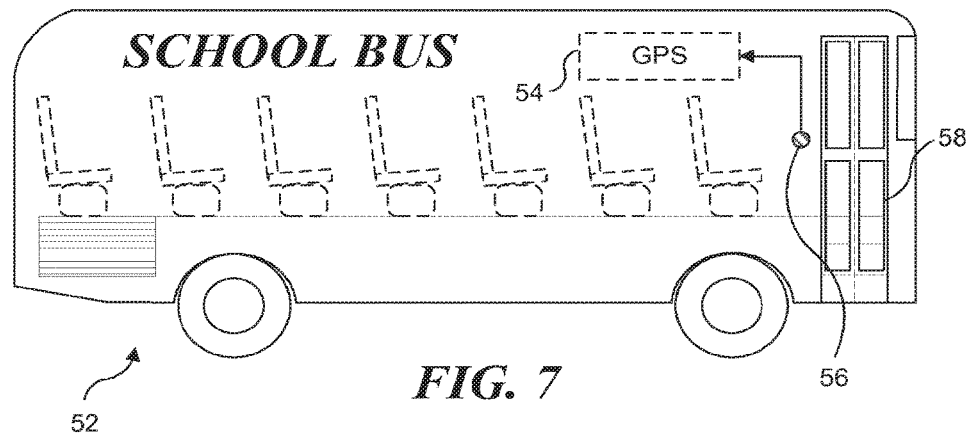
FIG. 7 schematically illustrates a school bus modified to implement the concepts disclosed herein, to collect and use object ID encoded position data.

FIG. 7 schematically illustrates a school bus modified to implement the concepts disclosed herein, to collect and/or use object ID encoded position data, where the object interacting with the vehicle is a student (i.e., a passenger) carrying a token that can be detected by the object identification sensor. Where the bus is configured to collect object ID encoded position data during operation of the bus, then the bus will include the functional elements discussed in connection with FIG. 2 (except the remote computing device, which of course is remote from the bus). Where the bus is configured to use previously generated object ID encoded position data to facilitate transportation of students (such as training a new driver to understand which students get on and off at what stop), generally as discussed above in connection with FIG. 5, then the bus will include the functional elements discussed in connection with FIG. 6. It should be recognized that the concepts disclosed herein encompass buses that perform both the methods discussed above in connection with FIGS. 1 and 5, and such buses will include the functional components of both FIGS. 2 and 6 (again, except for the remote computing device).

Referring to FIG. 7, as shown, bus 52 is configured to implement the method of FIG. 1 (i.e., to collect object ID encoded position data), and thus bus 52 includes a GPS unit 54 and an object ID sensor 56. Not specifically shown are the data link and processor elements of FIG. 2, which as discussed above, can be implemented by a GPS unit including such elements. As shown, ID sensor 56 is disposed proximate a door 58, so that ID sensor 56 can detect tokens carried by students as they board and exit the bus. Exemplary (but not limiting) tokens include RFID tags (which can be read automatically) and ID cards including a magnetic strip or optical data (which require the child to swipe the ID card through a reader as they enter the bus). If the bus is equipped with other doors that are used to board or disembark students, another ID sensor can be positioned at the other door. In an exemplary embodiment, once the boarding or disembarkation of students has occurred, the object ID encoded position data can be conveyed to the remote computing device of FIG. 2, and the remote computing device can make the boarding/disembarkation information available to school administrators or parents, either through a website accessible to the administrator/parent, or by sending the information in an email, a text message, a voice message, or an instant message. In an exemplary (but not limiting embodiment) administrators (that is a first class of users) would have access to boarding/disembarkation data about all students, whereas parents (that is, a second class of users) would only be able to access such data about their child (that is, a subset of passengers). Such boarding/disembarkation data would be generated from the object ID encoded position data collected at the vehicle, and would define the location and time a specific student boarded and/or exited the bus.

As noted above, the concepts disclosed herein also encompass bus 52 being configured to implement the method of FIG. 5 (i.e., to use previously generated object ID encoded position data to help the bus driver recognize what students should be boarding/exiting the bus at which stops). In such an embodiment, bus 52 will require GPS unit 54 (to track the current position of the bus, so a GPS processor or other processor can compare the current position of the bus with the previously generated object ID encoded position data, stored in a memory 48 as shown in FIG. 6). Bus 52 will also need to include the display/output device of FIG. 6, to provide a mechanism to inform the driver which students are associated with a specific bus stop.

If the bus configured to implement the method of FIG. 5 (using previously generated object ID encoded position data to help the bus driver recognize what students should be boarding/exiting the bus at which stops) is not intended to also implement the method of FIG. 1 (collecting object ID encoded position data while the bus is being currently operated), then the ID sensor and data link to the remote computing device shown in FIG. 2 are not required. Customers employing this technology will likely desire the flexibility of being able to perform both the method of FIG. 1 (collecting object ID encoded position data while the bus is being currently operated) and the method of FIG. 5 (using previously generated object ID encoded position data to help the bus driver recognize what students should be boarding/exiting the bus at which stops), and such buses will need to employ the components of both FIGS. 2 and 6 (i.e., the GPS unit, the ID sensor, the processor to combine the GPS data with the object ID data to generate the object ID encoded position data (which may be part of the GPS unit), the data link to convey the object ID encoded position data to the remote computing device, the memory storing the previously generated object ID encoded position data used to alert the driver which students are associated with which bus stops, the processor to monitor the current position of the bus and produce an indication/alert when the current position of the bus corresponds to a location correlated to one of the students (note the same processor combining the current GPS data with the object ID data can be used, or a separate processor can be used), and the display (or other output) used to alert the driver that the bus is at or approaching a location at which a particular student will get on or off.

Figure 8:
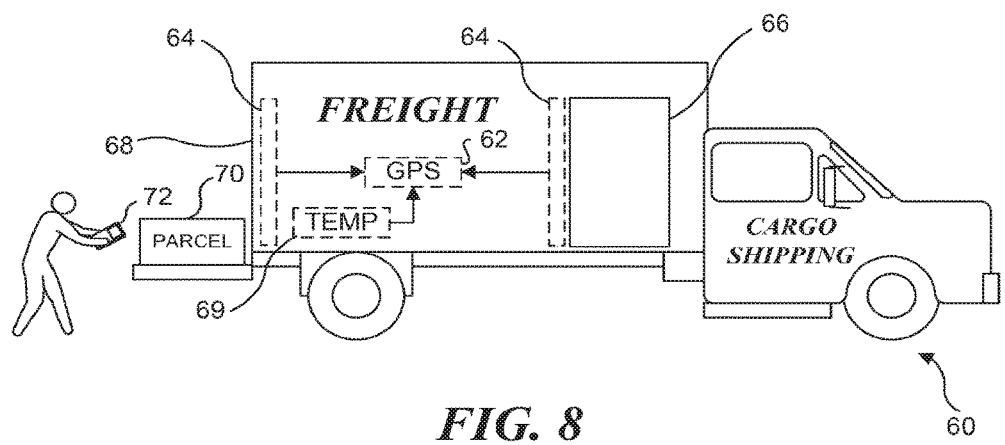
FIG. 8 schematically illustrates a delivery truck modified to implement the concepts disclosed herein, to collect and use object ID encoded position data.

FIG. 8 schematically illustrates a delivery truck modified to implement the concepts disclosed herein, to collect and/or use object ID encoded position data, where the object interacting with the vehicle is some type of cargo (including but not limited to a package, a document, an item of mail, a product, and a piece of equipment) including a token that can be detected by the object identification sensor. Once again, the delivery truck can be configured to implement one or both of the method of FIG. 1 (collecting object ID encoded position data while the delivery vehicle is delivering or picking up cargo) and the method of FIG. 5 (where the operator of the vehicle is using previously generated object ID encoded position data to help the delivery driver to deliver or pick up labeled cargo at specified locations). Where the delivery truck is configured to implement the method of FIG. 1 then the delivery truck will require the functional elements discussed in connection with FIG. 2 (except the remote computing device, which of course is remote from the delivery vehicle). Where the delivery vehicle is configured to use previously generated object ID encoded position data to facilitate delivery or pick up of cargo at specific locations (generally as discussed above in connection with FIG. 5), then the delivery vehicle will include the functional elements discussed in connection with FIG. 6. It should be recognized that the concepts disclosed herein encompass delivery vehicles that perform both the methods discussed above in connection with FIGS. 1 and 5, and such delivery vehicles will include the functional components of both FIGS. 2 and 6 (again, except for the remote computing device).

Referring to FIG. 8, as shown, delivery truck 60 is configured to implement the method of FIG. 1 (i.e., to collect object ID encoded position data about cargo being delivered or picked up), and thus delivery truck 60 includes a GPS unit 62 and one or more object ID sensors 64. Not specifically shown are the data link and processor elements of FIG. 2, which as discussed above can be implemented by a GPS unit including such elements. As shown, ID sensors 64 are disposed proximate a side door 66 and a rear door 68, so that ID sensors 64 can detect tokens attached to cargo 70 being picked up or delivered. As discussed above, many types of token/sensor combinations can be employed. In at least one embodiment, tokens are RFID tags that can automatically be read as the cargo passes through one of doors 66 and 68 (noting that some delivery vehicles have more or fewer doors, and the specific location of the door(s) can vary). This automatic sensing function should reduce the time required for loading and unloading, by eliminating any manual involvement in the object ID sensing function. Optical codes can also be employed, but the person loading/unloading the cargo would need to ensure the optical code can be scanned by the ID sensor (much in the way a grocery checker must ensure that products are read by the bar code scanner at checkout). As will be discussed below, the concepts disclosed herein also encompass the use of a handheld ID sensor 72, which though functional requires more effort on the part of the cargo handler.

If desired, a temperature sensor 69 can be included in the cargo area of the delivery truck, to measure the ambient temperature of the cargo area. The temperature measurement represents additional object data, that will be combined with the object ID and the time and GPS data, to generate the object ID encoded position data. The temperature sensor, if present, is configured to communicate its data to the GPS unit, or the processor responsible for combining the object ID data, the temperature data, and the GPS data together to generate the time indexed object ID encoded position data. The temperature data may be important for temperature sensitive cargo, and collecting such data and combining it with the object ID encoded position data will enable the delivery service to prove to the shipper that the cargo was maintained in the correct temperature controlled environment during transit. In a related embodiment, the temperature sensor can be incorporated into the object, and the temperature data can be manually entered into the GPS unit/processor during delivery, or acquired using a hand held sensor that logically communicates that data to the GPS unit/processor for incorporation into the object ID encoded position data.

In an exemplary embodiment, once the loading or unloading of cargo has occurred, the object ID encoded position data can be conveyed to the remote computing device of FIG. 2, and the remote computing device can make the loading/unloading information available to one or more of the delivery service, the cargo shipper, and the cargo recipient, either through a website accessible to the parties, or by sending the information in an email, a text message, a voice message, or an instant message. In an exemplary (but not limiting embodiment) the delivery service would have access to pick up/delivery data for all cargo, whereas shippers/recipients would only be able to access such data about their cargo. Such pick up/delivery data would be generated from the object ID encoded position data collected at the vehicle, and would define the location and time a item of cargo was loaded or unloaded from the delivery vehicle. This data can be used to assure shippers/recipients that their cargo was picked up/delivered, and may be used by the delivery service to bill their clients.

As noted above, the concepts disclosed herein also encompass delivery truck 60 being configured to implement the method of FIG. 5 (i.e., to use previously generated object ID encoded position data to help the delivery driver recognize what cargo should be loaded/unloaded from the delivery vehicle at which locations). In such an embodiment, delivery truck 60 will require GPS unit 62 (to track the current position of the vehicle, so a GPS processor or other processor can compare the current position of the vehicle with the previously generated object ID encoded position data, stored in a memory 48 as shown in FIG. 6). Delivery truck 60 will also need to include the display/output device of FIG. 6, to provide a mechanism to inform the driver which cargo is associated with a specific delivery or pick up location.

If delivery truck 60 is configured to implement the method of FIG. 5 (using previously generated object ID encoded position data to help the driver recognize what cargo is loaded/unloaded at what location) and is not intended to also implement the method of FIG. 1 (collecting object ID encoded position data while the delivery vehicle is being currently operated), then the ID sensor and data link to the remote computing device shown in FIG. 2 are not required. Customers employing this technology will likely desire the flexibility of being able to perform both the method of FIG. 1 (collecting object ID encoded position data while the delivery truck being currently operated) and the method of FIG. 5 (using previously generated object ID encoded position data to help the delivery driver recognize what cargo should be loaded/unloaded from the vehicle at what location), and such delivery vehicles will need to employ the components of both FIGS. 2 and 6 (i.e., the GPS unit, the ID sensor, the processor to combine the GPS data with the object ID data to generate the object ID encoded position data (which may be part of the GPS unit), the data link to convey the object ID encoded position data to the remote computing device, the memory storing the previously generated object ID encoded position data used to alert the driver which cargo is associated with which location, the processor to monitor the current position of the delivery vehicle and produce an indication/alert when the current position of the delivery vehicle corresponds to a location correlated to an item of cargo (note the same processor combining the current GPS data with the object ID data can be used, or a separate processor can be used), and the display (or other output) used to alert the driver that the delivery vehicle is at or approaching a location at which a item of cargo will be delivered or collected.

As noted above, when the method of FIG. 1 is being implemented in the context of cargo shipping, instead of equipping the vehicle with ID sensors 64 proximate vehicle doors 66 or 68 to automatically collect object ID data from the cargo, handheld ID sensor 72 can be manually used by a cargo handler (such as the driver) when loading or unloading the cargo. The handheld sensor must at some point be logically coupled with GPS 62 so that the object ID encoded position data can be generated. This can be achieved by using a physical connection, or a wireless data link. This embodiment may be less expensive (providing a handheld unit may be more cost effective that adding ID sensors to the doors), but reduces efficiency by requiring the cargo handler to perform an additional function.

Figure 9:
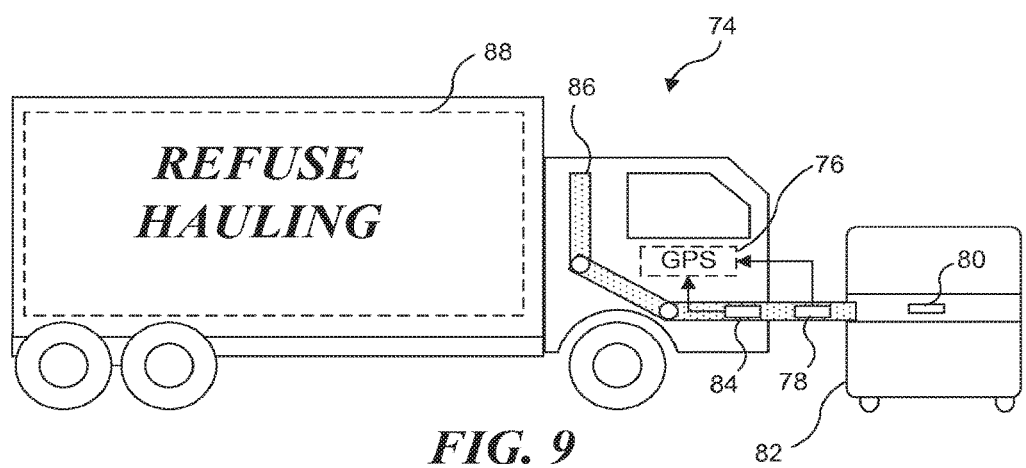
FIG. 9 schematically illustrates a refuse truck modified to implement the concepts disclosed herein, to collect and use object ID encoded position data.

FIG. 9 schematically illustrates a refuse truck (or recycling truck) modified to implement the concepts disclosed herein, to collect and/or use object ID encoded position data, where the object interacting with the vehicle is a refuse or recycling container whose contents is transferred from the container to the refuse truck. In at least one embodiment, the token read by the ID sensor is attached to the container itself, although it should be understood that the concepts disclosed herein encompass embodiments in which the token being detected by the ID sensor is attached to some other physical object or structure at the location where the container is stored. Once again, the refuse truck can be configured to implement one or both of the method of FIG. 1 (collecting object ID encoded position data while the refuse truck is collecting refuse or recyclables) and the method of FIG. 5 (where the operator of the vehicle is using previously generated object ID encoded position data to help the refuse truck driver to recognize what containers at what locations need to be emptied).

Where the refuse truck is configured to implement the method of FIG. 1, the refuse truck will require the functional elements discussed in connection with FIG. 2 (except the remote computing device, which of course is remote from the refuse truck). Where the refuse truck is configured to use previously generated object ID encoded position data to facilitate collection of refuse/recyclables from specific containers at specific locations (generally as discussed above in connection with FIG. 5), then the refuse truck will include the functional elements discussed in connection with FIG. 6. It should be recognized that the concepts disclosed herein encompass refuse trucks that perform both of the methods discussed above in connection with FIGS. 1 and 5, and such refuse trucks will include the functional components of both FIGS. 2 and 6 (again, except for the remote computing device).

Referring to FIG. 9, as shown, refuse truck 74 is configured to implement the method of FIG. 1 (i.e., to collect object ID encoded position data about containers from which recyclables or refuse is collected), and thus refuse truck 60 includes a GPS unit 76 and an object ID sensors 78, which as shown is disposed on a container manipulator 86 (which lifts and rotates a container 82, such that the refuse falls into a cargo area 88). Note the container manipulator need not be mounted on the front of the vehicle, as other container manipulator positions (such as at the sides or rear of the vehicle) are known. Not specifically shown are the data link and processor elements of FIG. 2, which as discussed above can be implemented by a GPS unit including such elements. The position of ID sensors 78 is such that the ID sensor can detect a token 80 that uniquely identifies container 82 automatically as container manipulator 86 engages the container. As discussed above, many types of token/sensor combinations can be employed. In at least one embodiment, tokens are RFID tags that can automatically be read as container manipulator 86 engages the container. This automatic sensing function should reduce the time required for identifying the object, by eliminating any manual involvement in the object ID sensing function. Optical codes can also be employed, but such optical codes can become obscured by dirt and grime, and may be less suitable for this application. As noted above, other embodiments encompassed by the concepts herein will place the token on a structure or object near the container, rather than the container itself, and in such embodiments the ID sensor may be positioned differently. The concepts disclosed herein also encompass embodiments in which the vehicle operator uses a handheld ID sensor to read a token, which though functional requires more effort on the part of the operator. If desired, a weight sensor 84 can be included on container manipulator 86, to measure the full weight and emptied weight of the container, to enable the weight of the refuse unloaded from the container to be measured (note that such a weight sensor could also be included in cargo area 88, to measure the weight of the material in the cargo area before and after a container is emptied). The weight measurement represents additional object data, that will be combined with the object ID and the time and GPS data, to generate the object ID encoded position data.

In an exemplary embodiment, once the container has been emptied, the object ID encoded position data can be conveyed to the remote computing device of FIG. 2, and the remote computing device can make the container emptying information available to one or more of the refuse removal service and the client, either through a website accessible to the parties, or by sending the information in an email, a text message, a voice message, or an instant message. In an exemplary (but not limiting embodiment) the refuse removal service would have access to pick up data for all containers, whereas clients would only be able to access such data about their containers. Such pick up data would be generated from the object ID encoded position data collected at the vehicle, and would define the location and time a container was emptied, and the weight of the material removed, if the weight data was collected. This data can be used to assure clients that their refuse was picked up, and may be used by the refuse removal service to bill their clients.

As noted above, the concepts disclosed herein also encompass refuse truck 74 being configured to implement the method of FIG. 5 (i.e., to use previously generated object ID encoded position data to help the driver recognize what containers should be emptied at which locations). In such an embodiment, refuse truck 74 will require GPS unit 76 (to track the current position of the vehicle, so a GPS processor or other processor can compare the current position of the vehicle with the previously generated object ID encoded position data, stored in a memory 48 as shown in FIG. 6). Refuse truck 74 will also need to include the display/output device of FIG. 6, to provide a mechanism to inform the driver what containers are associated with a specific service location.

If refuse truck 74 is configured to implement the method of FIG. 5 (using previously generated object ID encoded position data to help the driver recognize what containers are emptied at what location) and is not intended to also implement the method of FIG. 1 (collecting object ID encoded position data while the refuse truck is being currently operated), then the ID sensor and data link to the remote computing device shown in FIG. 2 are not required. Customers employing this technology will likely desire the flexibility of being able to perform both the method of FIG. 1 (collecting object ID encoded position data while the refuse truck being currently operated) and the method of FIG. 5 (using previously generated object ID encoded position data to help the delivery driver recognize what containers should be emptied at what location), and such refuse trucks will need to employ the components of both FIGS. 2 and 6 (i.e., the GPS unit, the ID sensor, the processor to combine the GPS data with the object ID data to generate the object ID encoded position data (which may be part of the GPS unit), the data link to convey the object ID encoded position data to the remote computing device, the memory storing the previously generated object ID encoded position data used to alert the driver about which containers are associated with which locations, the processor to monitor the current position of the vehicle and produce an indication/alert when the current position of the refuse truck corresponds to a location correlated to a labeled container (note the same processor combining the current GPS data with the object ID data can be used, or a separate processor can be used), and the display (or other output) used to alert the driver that the refuse truck is at or approaching a location at which a container will be emptied.

Figure 10:
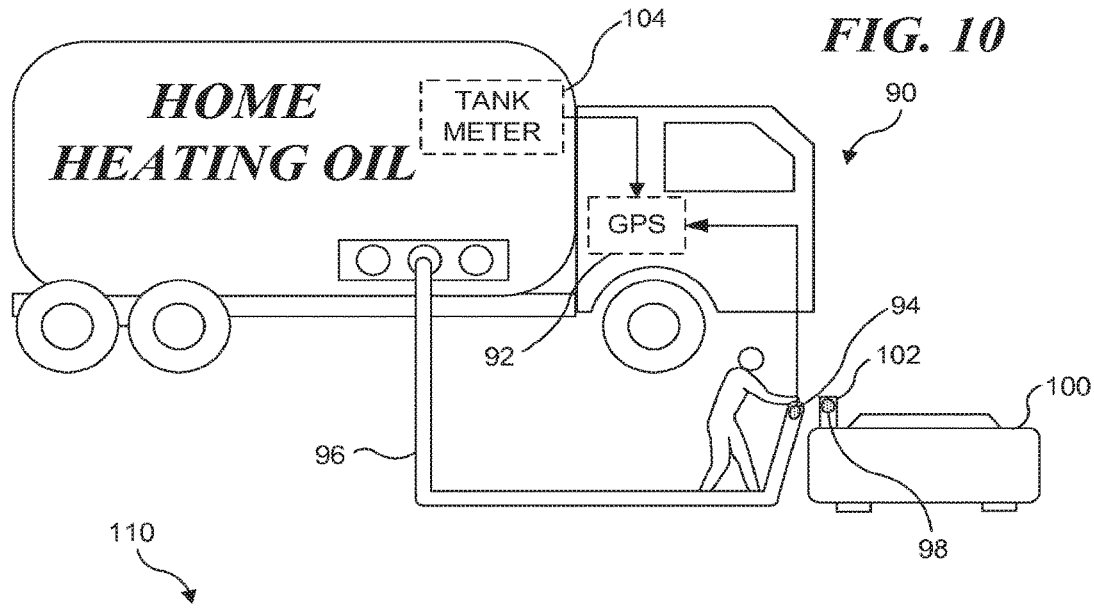
FIG. 10 schematically illustrates a fuel truck modified to implement the concepts disclosed herein, to collect and use object ID encoded position data.

FIG. 10 schematically illustrates a tanker truck modified to implement the concepts disclosed herein, to collect and/or use object ID encoded position data, where the object interacting with the vehicle is a bulk material storage container (such as a home heating oil storage tank, a propane gas fuel storage tank, or a compressed gas storage tank, understanding that such types of storage tanks are intended to be exemplary, rather than limiting), where a product or bulk material is transferred from the tanker truck to the storage tank. In at least one embodiment, the token read by the ID sensor is attached to the storage tank itself, although it should be understood that the concepts disclosed herein encompass embodiments in which the token being detected by the ID sensor is attached to some other physical object or structure at the location where the storage tank is stored. Once again, the tanker truck can be configured to implement one or both of the method of FIG. 1 (collecting object ID encoded position data while the tanker truck is out delivering bulk materials to storage tanks) and the method of FIG. 5 (where the operator of the tanker truck is using previously generated object ID encoded position data to help the tanker truck driver to recognize what storage tanks at which locations need to be filled).

Where the tanker truck is configured to implement the method of FIG. 1, the tanker truck will require the functional elements discussed in connection with FIG. 2 (except the remote computing device, which of course is remote from the tanker truck). Where the tanker truck is configured to use previously generated object ID encoded position data to facilitate delivery of a bulk material to a specific storage tank at specific locations (generally as discussed above in connection with FIG. 5), then the tanker truck will include the functional elements discussed in connection with FIG. 6. It should be recognized that the concepts disclosed herein encompass tanker trucks that perform both the methods discussed above in connection with FIGS. 1 and 5, and such tanker trucks will include the functional components of both FIGS. 2 and 6 (again, except for the remote computing device).

Referring to FIG. 10, as shown tanker truck 90 is configured to implement the method of FIG. 1 (i.e., to collect object ID encoded position data about storage tanks to which the tanker truck is delivering a bulk material), and thus tanker truck 90 includes a GPS unit 92 and an object ID sensor 94, which as shown is disposed on a distal end of a product delivery hose 96 (which is used to transfer the bulk material from the tanker truck to a storage tank 100, which is labeled with a token 98). Note as shown, the ID sensor (disposed on the distal end of the delivery hose) and the token on the storage tank (disposed proximate an inlet 102 to the storage tank) will be in close proximity to each other when the delivery hose is coupled to the tank inlet. Thus, the position of ID sensors 94 is such that the ID sensor can detect token 98 (which uniquely identifies storage tank 100 automatically as the delivery hose engages the tank inlet). As discussed above, many types of token/sensor combinations can be employed. In at least one embodiment, tokens are RFID tags that can automatically be read as the delivery hose engages the tank inlet. Because the bulk material may be flammable, care needs to be taken that the ID sensor/token interaction does not generate a spark or static electricity that could act as an ignition source. For bulk transfer of flammable material, grounding is routinely performed to minimize such risks. This automatic sensing function should reduce the time required for identifying the object, by eliminating any manual involvement in the object ID sensing function. Optical codes can also be employed, but such optical codes can become obscured by dirt and grime, and may be less suitable for this application. As noted above, other embodiments encompassed by the concepts herein will place the token on a structure or object near the storage tank, rather than the container itself, and in such embodiments the ID sensor may be positioned differently. The concepts disclosed herein also encompass embodiments in which the tank truck operator uses a handheld ID sensor to read a token, which though functional requires more effort on the part of the operator.

If desired, a volume delivery sensor 104 can be included on the tanker truck, to measure the volume of bulk material being delivered. The volume measurement represents additional object data, that will be combined with the object ID and the time and GPS data, to generate the object ID encoded position data. Referring to FIG. 10 and its relationship to the elements of FIG. 2, FIG. 10 does not specifically show the data link and processor elements of FIG. 2, which as discussed above can be implemented by a GPS unit including such elements.

In an exemplary embodiment, once the storage tank has been filled, the object ID encoded position data can be conveyed to the remote computing device of FIG. 2, and the remote computing device can make the tank filling information available to one or more of the tanker truck service and the client, either through a website accessible to the parties, or by sending the information in an email, a text message, a voice message, or an instant message. In an exemplary (but not limiting embodiment) the tanker truck service would have access to filling data for all storage tanks, whereas clients would only be able to access such data about their storage tanks. Such tank filling data would be generated from the object ID encoded position data collected at the tanker truck, and would define the location and time a storage tank was filled, and the volume of the material transferred, if the volume data was collected. This data can be used to assure clients that their tank was filled, and may be used by the tanker truck service to bill their clients.

As noted above, the concepts disclosed herein also encompass tanker truck 90 being configured to implement the method of FIG. 5 (i.e., to use previously generated object ID encoded position data to help the driver recognize what storage tanks at which locations should be filled). In such an embodiment, tanker truck 90 will require GPS unit 92 (to track the current position of the vehicle, so a GPS processor or other processor can compare the current position of the vehicle with the previously generated object ID encoded position data, stored in a memory 48 as shown in FIG. 6). Tanker truck 90 will also need to include the display/output device of FIG. 6, to provide a mechanism to inform the driver what storage tanks are associated with a specific service location.

If tanker truck 90 is configured to implement the method of FIG. 5 (using previously generated object ID encoded position data to help the driver recognize what storage tanks are filled at what location) and is not intended to also implement the method of FIG. 1 (collecting object ID encoded position data while the tanker truck is being currently operated), then the ID sensor and data link to the remote computing device shown in FIG. 2 are not required. Customers employing this technology will likely desire the flexibility of being able to perform both the method of FIG. 1 (collecting object ID encoded position data while the tanker truck being currently operated) and the method of FIG. 5 (using previously generated object ID encoded position data to help the tanker truck driver recognize what storage tanks should be filled at what location), and such tanker trucks will need to employ the components of both FIGS. 2 and 6 (i.e., the GPS unit, the ID sensor, the processor to combine the GPS data with the object ID data to generate the object ID encoded position data (which may be part of the GPS unit), the data link to convey the object ID encoded position data to the remote computing device, the memory storing the previously generated object ID encoded position data used to alert the driver about which storage tanks are associated with which locations, the processor to monitor the current position of the vehicle and produce an indication/alert when the current position of the tanker truck corresponds to a location correlated to a labeled storage tank (note the same processor combining the current GPS data with the object ID data can be used, or a separate processor can be used), and the display (or other output) used to alert the driver that the tanker truck is at or approaching a location at which a storage tank will be filled.

With respect to any of the embodiments of FIGS. 7-10, it should be recognized that the relative location of the GPS unit in the vehicle as shown in the Figure is intended to be exemplary, rather than limiting.

Figure 11:
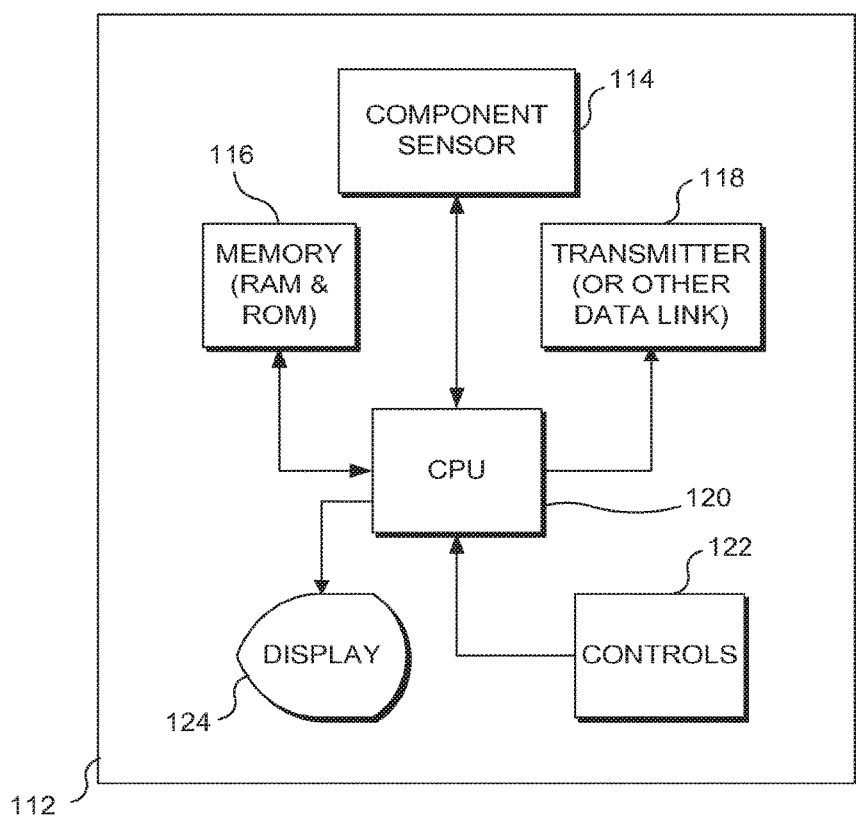
FIG. 11 is a functional block diagram showing the basic functional components used to implement a handheld identification sensor, which can be used by a vehicle operator to collect object identification data.

FIG. 11 is a functional block diagram showing the basic functional components used to implement a hand held identification sensor, which can be used by a vehicle operator to collect object identification data, as shown in FIG. 8. A hand held ID sensor 110 includes a plurality of functional components that are included in portable ID sensor 110, either on or inside a housing 112. A central processing unit (CPU) 120 comprises the controller for portable ID sensor 110 and is coupled bi-directionally to a memory 116 that includes both random access memory (RAM) and read only memory (ROM). Memory 116 is used for storing data in RAM and machine instructions in ROM that control the functionality of CPU 120 when executed by it. CPU 120 is also coupled to ID sensor 114, and is configured to receive operator input from user controls 122. In addition, CPU 120 provides text and graphics to display 124 for the prompts and other messages, and menu items and options from which the operator can select, using controls 122.

After the operator has used portable ID sensor 110 to identify each labeled object, the operator can transmit the object ID data that have been collected to the vehicle GPS or the processor that will combine the object ID data with the GPS data to generate the object ID encoded position data, using a data link 118 (in an exemplary embodiment the data link employs an RF transmission, though hardwired and other wireless type data links can be used).

As noted above, the tokens that are affixed to the objects to be identified can be of several different types, depending upon the type of sensor 114 that is included on portable ID sensor 110. In a preferred form of one of the concepts disclosed herein, the token that is preferably employed is an RFID tag that is attached with a fastener or an appropriate adhesive to the object (or is carried by a passenger, or is attached to a location proximate the object, generally as discussed above). One type of RFID tag that is suitable for this purpose is the WORLDTAG™ token that is sold by Sokymat Corporation. This tag is excited by an RF transmission from portable ID sensor 110 via an antenna in sensor 114. In response to the excitation energy received, the RFID tag modifies the RF energy that is received from the antenna in sensor 114 in a manner that specifically identifies the component associated with the RFID tag, and the modified signal is detected by sensor 46.

An alternative type of token that can also be used in one of the concepts disclosed herein is an IBUTTON™ computer chip, which is armored in a stainless steel housing and is readily affixed to an object or location. The IBUTTON chip is programmed with JAVA™ instructions to provide a recognition signal when interrogated by a signal received from a nearby transmitter, such as from an antenna in sensor 114. The signal produced by the IBUTTON chip is received by sensor 114, which determines the type of component associated with a token. This type of token is less desirable since it is more expensive, although the program instructions that it executes can provide greater functionality.

Yet another type of token that might be used is an optical bar code in which a sequence of lines of varying width or other optical patterns encode light reflected from the bar code tag. The encoded reflected light is received by sensor 114, which is then read by an optical detector. Bar code technology is well understood by those of ordinary skill in the art and readily adapted for identifying a particular type of component and location of the component on a vehicle or other system or apparatus. One drawback to the use of a bar code tag as a token is that the bar code can be covered with dirt or grime that must be cleaned before the sequence of bar code lines or other pattern can be properly read. If the bar code is applied to a plasticized adhesive strip, it can readily be mounted to any surface and then easily cleaned with a rag or other appropriate material.

Yet another type of token usable in one of the concepts disclosed herein is a magnetic strip in which a varying magnetic flux encodes data identifying the particular component associated with the token. Such magnetic strips are often used in access cards that are read by readers mounted adjacent to doors or in an elevator that provides access to a building. However, in this aspect of the concepts disclosed herein, the magnetic flux reader comprises sensor 114. The data encoded on such a token are readily read as the portable device is brought into proximity of the varying magnetic flux encoded strip comprising the token.

As yet another alternative, an active token can be employed that conforms to the BLUETOOTH™ specification for short distance data transfer between computing devices using an RF signal.

In at least one embodiment, the interaction between the vehicle and a labeled object is an inspection of the object. The vehicle is used to convey the inspector to the labeled object. A sensor attached to the vehicle or in a handheld device is used to collect the object ID data, which is combined with the position data collected by the vehicle to generate the object ID encoded position data, which can be used to verify that the inspector was proximate the specific object at a specific time. Objects that can be labeled for inspection include, but are not limited to, buildings, bridges, utility vaults, traffic signals, traffic signs, cell phone towers, transformers, pipelines, utility poles, and construction equipment.

In at least one embodiment, the interaction between the vehicle and a labeled object does not include loading the object onto the vehicle or removing the object from the vehicle. Thus, in the claims that follow, it should be recognized that support exists for a negative claim limitation to that effect. FIGS. 9 and 10 relate to embodiments where material is loaded from a container into the vehicle, or from the vehicle into the container, without the container (the labeled object) being loaded onto or being removed from the vehicle. Another type of interaction between a labeled object and the vehicle includes the vehicle being used to transport an inspector to the location of a labeled object that requires an inspection. In such an embodiment, inspection of the object will not result in the object being loaded onto or being removed from the vehicle. In each of these interactions, object ID data is collected from the object, which is combined with the position data collected by the vehicle to generate the object ID encoded position data.

In at least one embodiment, the interaction between the vehicle and a labeled object involves loading or unloading the object from a cargo area in the vehicle that is not suitable for passengers. Thus, in the claims that follow, it should be recognized that support exists for a negative claim limitation to that effect. FIG. 8 relates to an embodiment where objects are loaded or unloaded from a non-passenger cargo area.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

While a number of exemplary aspects and embodiments have been discussed above, those possessed of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

The invention claimed is:

1. A method for generating object identification (ID) encoded position data from a refuse collection truck servicing a set of refuse containers, having a pair of loading arms for emptying a refuse container into a truck refuse storage volume, the refuse collection truck being equipped with a geographical position system, the method comprising the steps of:
   (a) collecting geographical position data from the refuse collection truck during refuse collection truck operation, the geographical position data being time indexed;
   (b) collecting object ID data from the refuse containers, the object ID data uniquely identifying each of the refuse containers and being readable in association to each of said refuse holding containers, wherein the step of collecting object ID data from a refuse container comprises at least one of the following steps:
   (i.) using an identification sensor attached to the loading arms that are used to empty refuse containers into the refuse collection truck, to read the object ID; and
   (ii.) scanning the object ID using a handheld device including an identification sensor and a wireless data link, the handheld device being configured to wirelessly transmit object ID data to a processor disposed in the refuse collection truck, the processor being configured to combine the object ID data with the position data; and (c) automatically combining the object ID data, identifying the object, and the geographical position data together at the refuse collection truck to produce object ID encoded position data, and thereby creating a record of refuse transfer with of each one of the set of refuse holding containers, that includes object ID, uniquely identifying the refuse holding container, the geographical position of the truck at the time the refuse transfer was made, and time indexing, indicating the time of refuse container identification, contemporaneous with the refuse transfer.

2. The method of claim 1, further comprising the step of conveying the object ID encoded position data to a remote computing device.

3. The method of claim 1, further comprising the steps of:
  (a) collecting additional data from the refuse containers;
  (b) including the additional data in the object ID encoded position data such that the additional object data is also time indexed.

4. The method of claim 3, wherein the additional data collected from the refuse containers comprises a volume of refuse transferred between the container and the refuse collection truck during the interaction between the container and the refuse collection truck, so that the record of refuse transfer, with each one of the set of refuse holding containers includes the volume of refuse transferred and the direction of transfer.

5. The method of claim 1, further wherein the refuse containers are spaced along a predetermined route, and further comprising the steps of:
  (a) as the refuse collection truck is operating, comparing the current position of the refuse collection truck with a location associated with each refuse container; and
  (b) whenever the current position of the refuse collection truck corresponds to the location of a refuse container, alerting the driver of the refuse collection truck that the location of a refuse container has been reached.

6. The method of claim 1, wherein the step of collecting ID data from the refuse holding container comprises using a radio frequency identification (RFID) tag sensor attached to a loading arm that is used to deliver refuse to the refuse collection truck, to identify the object.

7. The method of claim 1, wherein the servicing of the refuse holding container includes connecting the loading arms to the container, and wherein in the step of connecting the loading arms, the RFID tag sensor is brought into a close proximity with an RFID tag located on the refuse holding container.

8. The method of claim 1, wherein the step of collecting ID data from the refuse holding container comprises using a handheld sensor to read an identifier located near said refuse holding container.

* * * * *